US012298416B2

(12) United States Patent
Bao et al.

(10) Patent No.: US 12,298,416 B2
(45) Date of Patent: May 13, 2025

(54) REPORTING OF COMBINED MEASUREMENT ASSOCIATED WITH MULTIPLE SAMPLES FOR A POSITION ESTIMATION SESSION

(71) Applicant: QUALCOMM Incorporated, San Diego, CA (US)

(72) Inventors: Jingchao Bao, San Diego, CA (US); Sony Akkarakaran, Poway, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/441,870

(22) Filed: Feb. 14, 2024

(65) Prior Publication Data

US 2024/0183925 A1 Jun. 6, 2024

Related U.S. Application Data

(62) Division of application No. 17/450,943, filed on Oct. 14, 2021, now Pat. No. 11,960,014.

(51) Int. Cl.
*G01S 5/00* (2006.01)
*G01S 5/02* (2010.01)
(Continued)

(52) U.S. Cl.
CPC ............ *G01S 5/0036* (2013.01); *G01S 5/021* (2013.01); *H04L 5/0051* (2013.01); *H04W 24/10* (2013.01)

(58) Field of Classification Search
CPC ...... G01S 5/0036; G01S 5/021; G01S 5/0236; G01S 1/024; H04W 4/02; H04W 64/00;
(Continued)

(56) References Cited

U.S. PATENT DOCUMENTS 10,218,471 B1    2/2019  Kumar et al.
2014/0295881 A1  10/2014 Werner et al.
(Continued)

FOREIGN PATENT DOCUMENTS

WO    2020222956 A1    11/2020

OTHER PUBLICATIONS

CMCC: "Discussion on Mitigation of gNB/UE Rx/Tx Timing Errors", 3GPP TSG RAN WG1 #106-e, R1-2107403, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, 7 Pages, Aug. 7, 2021 (Aug. 7, 2021), XP052038342, p. 1-p. 7.
(Continued)

*Primary Examiner* — Siu M Lee
(74) *Attorney, Agent, or Firm* — Thien T. Nguyen

(57) ABSTRACT

Disclosed are techniques for communication. In an aspect, a UE reports a combination pattern for a combined measurement associated with samples across PRS occasions of a PRS measurement procedure. In another aspect, a UE reports a combined calibration error of a combined measurement associated with samples across PRS occasions of a PRS measurement procedure. The reported combination pattern and/or combined calibration error may be used by a position estimation entity for derivation of a position estimate of the UE.

16 Claims, 23 Drawing Sheets

(51) Int. Cl.
*H04L 5/00* (2006.01)
*H04W 24/10* (2009.01)

(58) Field of Classification Search
CPC ...... H04W 24/10; H04L 5/0007; H04L 5/005; H04L 5/0051
See application file for complete search history.

(56) References Cited

U.S. PATENT DOCUMENTS

| | | | |
|---|---|---|---|
| 2016/0195601 A1 | 7/2016 | Siomina et al. | |
| 2020/0351813 A1* | 11/2020 | Manolakos | H04W 24/10 |
| 2021/0105781 A1* | 4/2021 | Manolakos | H04L 5/001 |
| 2023/0122170 A1 | 4/2023 | Bao et al. | |

OTHER PUBLICATIONS

International Search Report and Written Opinion—PCT/US2022/075752—ISA/EPO—Dec. 15, 2022.
Partial International Search Report—PCT/US2022/075752—ISA/EPO—Nov. 23, 2022.
European Search Report—EP24215174—Search Authority—The Hague—Jan. 22, 2025.

\* cited by examiner

REPORTING OF COMBINED MEASUREMENT ASSOCIATED WITH MULTIPLE SAMPLES FOR A POSITION ESTIMATION SESSION

CROSS-REFERENCE TO RELATED APPLICATIONS

The present Application for Patent is a Divisional of U.S. Non-Provisional application Ser. No. 17/450,943, entitled "REPORTING OF COMBINED MEASUREMENT ASSOCIATED WITH MULTIPLE SAMPLES FOR A POSITION ESTIMATION SESSION," filed Oct. 14, 2021, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes performing a set of measurements of a set of samples associated with a set of positioning reference signal (PRS) occasions; combining measurements associated with a subset of samples into a combined measurement in accordance with a combination pattern; and transmitting, to a position estimation entity, a measurement report comprising the combined measurement and an indication of the combination pattern.

In an aspect, a method of operating a position estimation entity includes receiving, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and deriving a position estimate of the UE based at least in part on the combined measurement and the combination pattern.

In an aspect, a method of operating a user equipment (UE) includes performing a set of measurements of a set of samples associated with a set of positioning reference signal (PRS) occasions; combining measurements associated with a subset of samples into a combined measurement in accordance with a combination pattern; determining a combined calibration error associated with the combined measurement; transmitting, to a position estimation entity, a measurement report comprising the combined measurement and an indication of the combined calibration error.

In an aspect, a method of operating a position estimation entity includes receiving, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and deriving a position estimate of the UE based at least in part on the combined measurement and the combined calibration error.

In an aspect, a user equipment (UE) includes a memory; at least one transceiver; and at least one processor communicatively coupled to the memory and the at least one transceiver, the at least one processor configured to: perform a set of measurements of a set of samples associated with a set of positioning reference signal (PRS) occasions; combine measurements associated with a subset of samples into a combined measurement in accordance with a combination pattern; and transmit, via the at least one transceiver, to a position estimation entity, a measurement report comprising the combined measurement and an indication of the combination pattern.

In an aspect, a position estimation entity includes a memory; at least one transceiver; and at least one processor communicatively coupled to the memory and the at least one transceiver, the at least one processor configured to: receive, via the at least one transceiver, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and derive a position estimate of the UE based at least in part on the combined measurement and the combination pattern.

In an aspect, an UE includes a memory; at least one transceiver; and at least one processor communicatively coupled to the memory and the at least one transceiver, the at least one processor configured to: perform a set of measurements of a set of samples associated with a set of positioning reference signal (PRS) occasions; combine measurements associated with a subset of samples into a combined measurement in accordance with a combination pattern; determine a combined calibration error associated with the combined measurement; transmit, via the at least one transceiver, to a position estimation entity, a measurement report comprising the combined measurement and an indication of the combined calibration error.

In an aspect, a position estimation entity includes a memory; at least one transceiver; and at least one processor communicatively coupled to the memory and the at least one transceiver, the at least one processor configured to: receive, via the at least one transceiver, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and derive a position estimate of the UE based at least in part on the combined measurement and the combined calibration error.

In an aspect, a user equipment (UE) includes means for performing a set of measurements of a set of samples associated with a set of positioning reference signal (PRS) occasions; means for combining measurements associated with a subset of samples into a combined measurement in accordance with a combination pattern; and means for transmitting, to a position estimation entity, a measurement report comprising the combined measurement and an indication of the combination pattern.

In an aspect, a position estimation entity includes means for receiving, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and means for deriving a position estimate of the UE based at least in part on the combined measurement and the combination pattern.

In an aspect, an UE includes means for performing a set of measurements of a set of samples associated with a set of positioning reference signal (PRS) occasions; means for combining measurements associated with a subset of samples into a combined measurement in accordance with a combination pattern; means for determining a combined calibration error associated with the combined measurement; means for transmitting, to a position estimation entity, a measurement report comprising the combined measurement and an indication of the combined calibration error.

In an aspect, a position estimation entity includes means for receiving, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and means for deriving a position estimate of the UE based at least in part on the combined measurement and the combined calibration error.

In an aspect, a non-transitory computer-readable medium storing computer-executable instructions that, when executed by a user equipment (UE), cause the UE to: perform a set of measurements of a set of samples associated with a set of positioning reference signal (PRS) occasions; combine measurements associated with a subset of samples into a combined measurement in accordance with a combination pattern; and transmit, to a position estimation entity, a measurement report comprising the combined measurement and an indication of the combination pattern.

In an aspect, a non-transitory computer-readable medium storing computer-executable instructions that, when executed by a position estimation entity, cause the position estimation entity to: receive, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and derive a position estimate of the UE based at least in part on the combined measurement and the combination pattern.

In an aspect, a non-transitory computer-readable medium storing computer-executable instructions that, when executed by an UE, cause the UE to: perform a set of measurements of a set of samples associated with a set of positioning reference signal (PRS) occasions; combine measurements associated with a subset of samples into a combined measurement in accordance with a combination pattern; determine a combined calibration error associated with the combined measurement; transmit, to a position estimation entity, a measurement report comprising the combined measurement and an indication of the combined calibration error.

In an aspect, a non-transitory computer-readable medium storing computer-executable instructions that, when executed by a position estimation entity, cause the position estimation entity to: receive, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and derive a position estimate of the UE based at least in part on the combined measurement and the combined calibration error.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
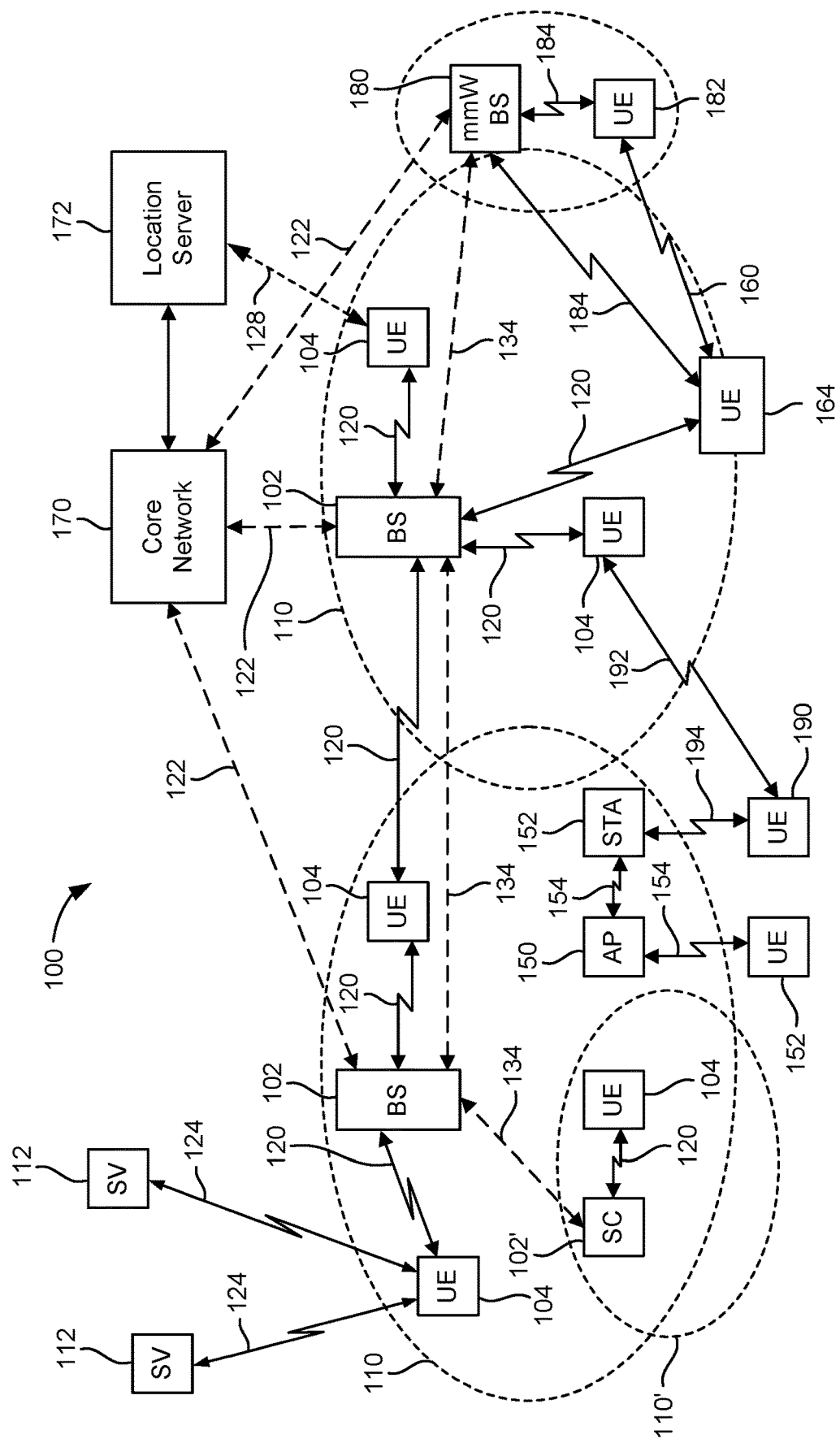
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL)

channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
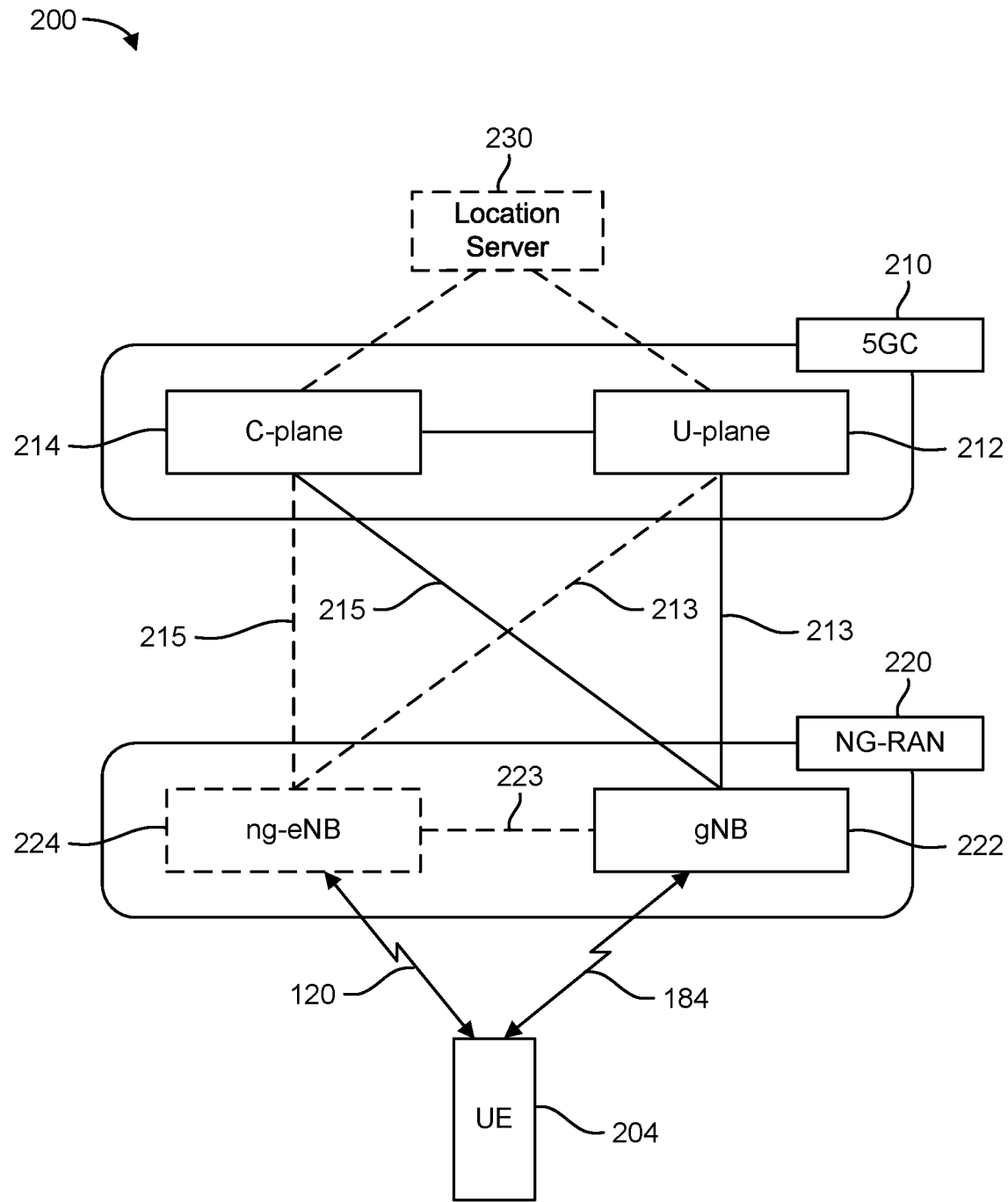
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
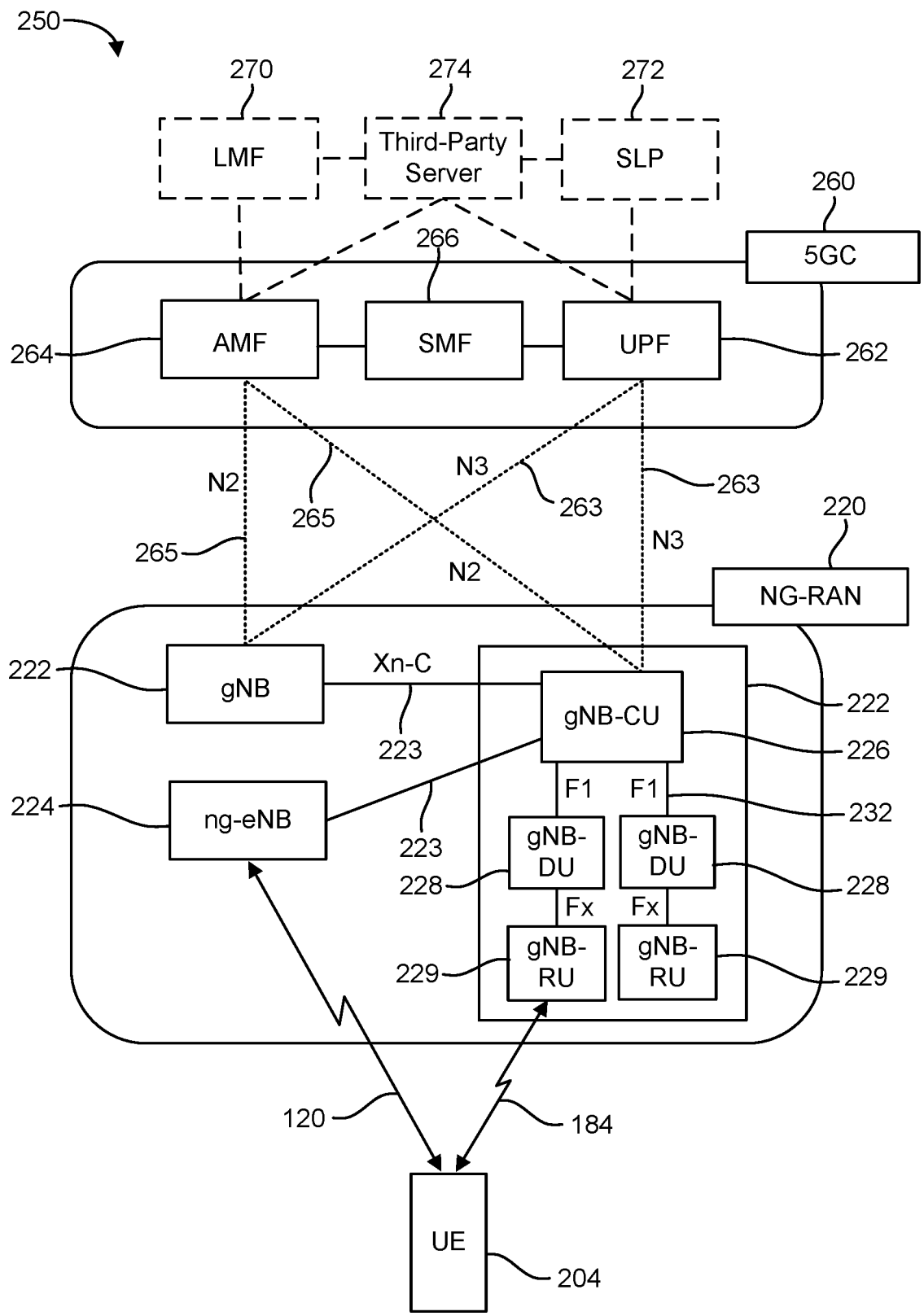

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface.

The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
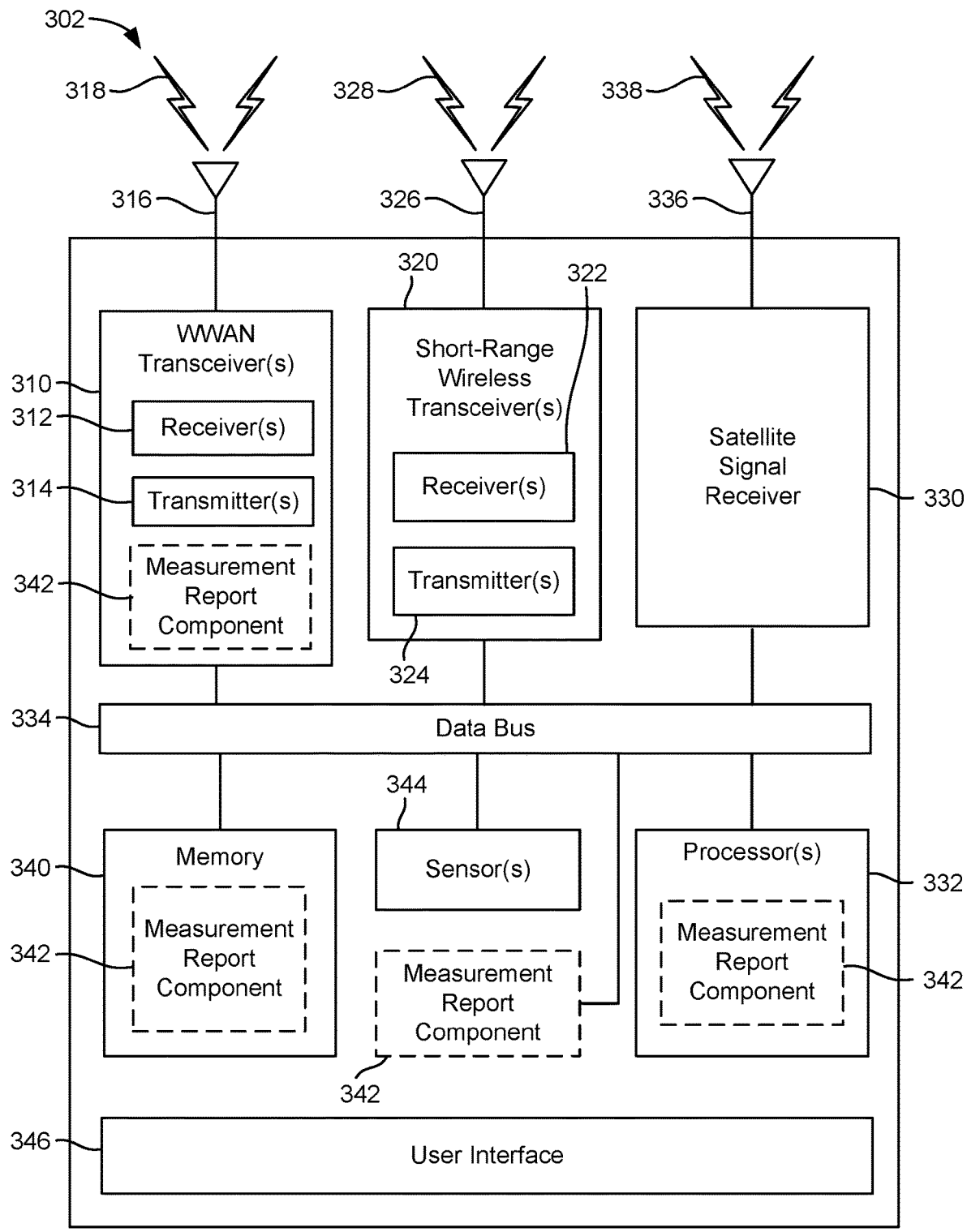
FIGS. 3A, 3B, and 3C are simplified block diagrams of several sample aspects of components that may be employed in a user equipment (UE), a base station, and a network entity, respectively, and configured to support communications as taught herein.
Figure 3B:
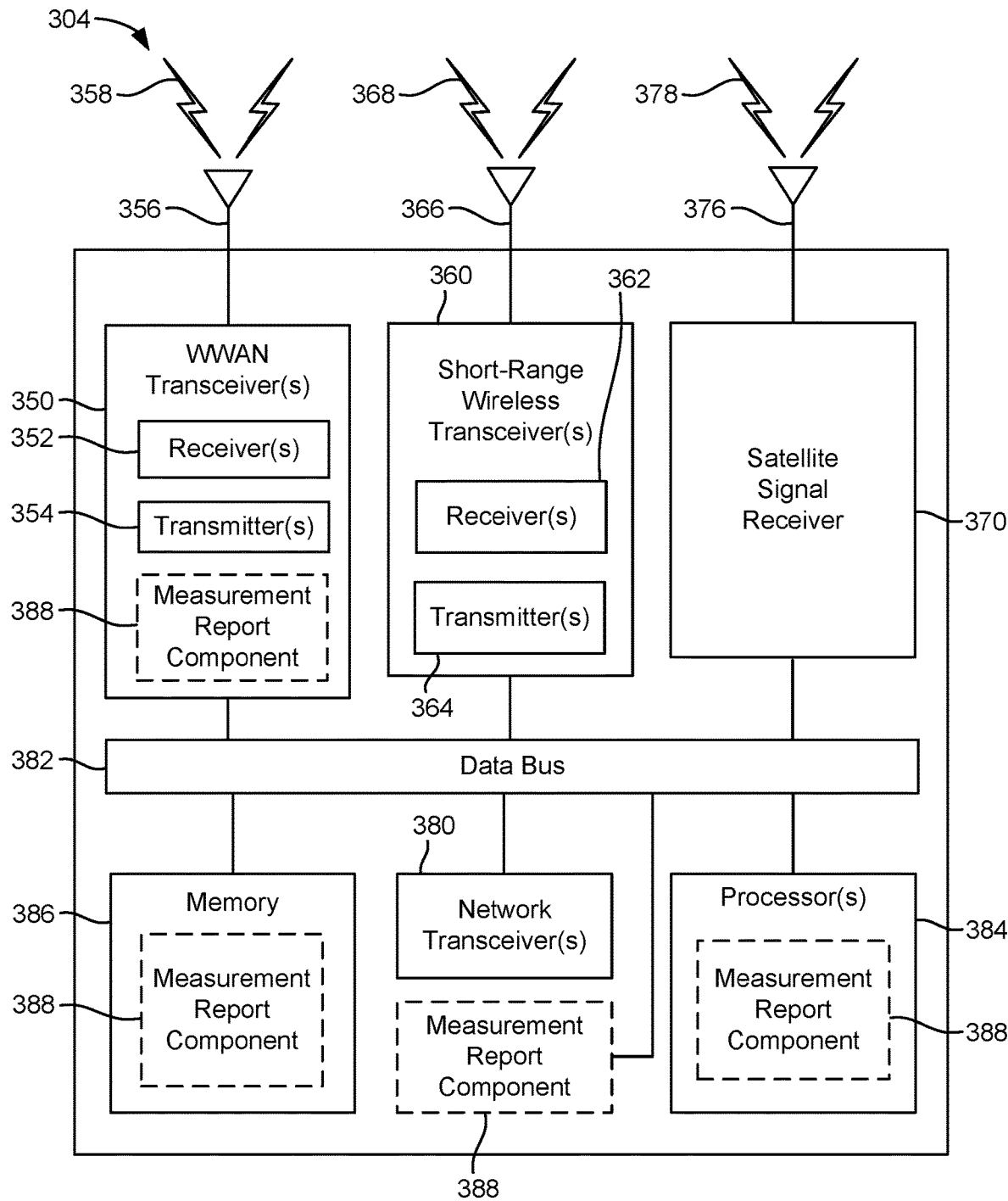
Figure 3C:
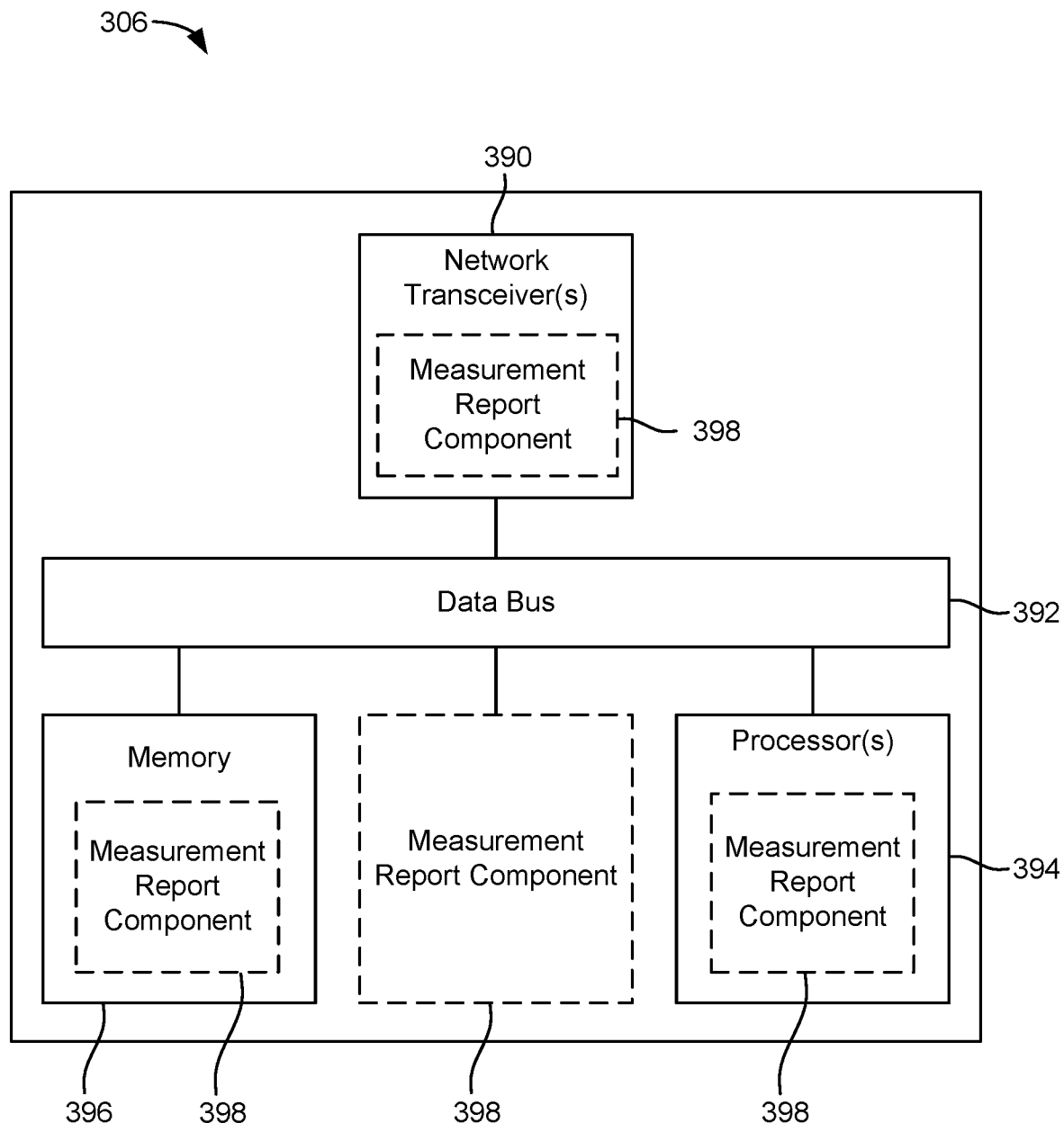

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include measurement report component 342, 388, and 398, respectively. The measurement report component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the measurement report component 342, 388, and 398 may be external to the processors 332, 384, and 394 (e.g., part of a modem processing system, integrated with another processing system, etc.). Alternatively, the measurement report component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the measurement report component 342, which may be, for example, part of the one or more WWAN transceivers 310, the memory 340, the one or more processors 332, or any combination thereof, or may be a standalone component. FIG. 3B illustrates possible locations of the measurement report component 388, which may be, for example, part of the one or more WWAN transceivers 350, the memory 386, the one or more processors 384, or any combination thereof, or may be a standalone component. FIG. 3C illustrates possible locations of the measurement report component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the measurement report component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
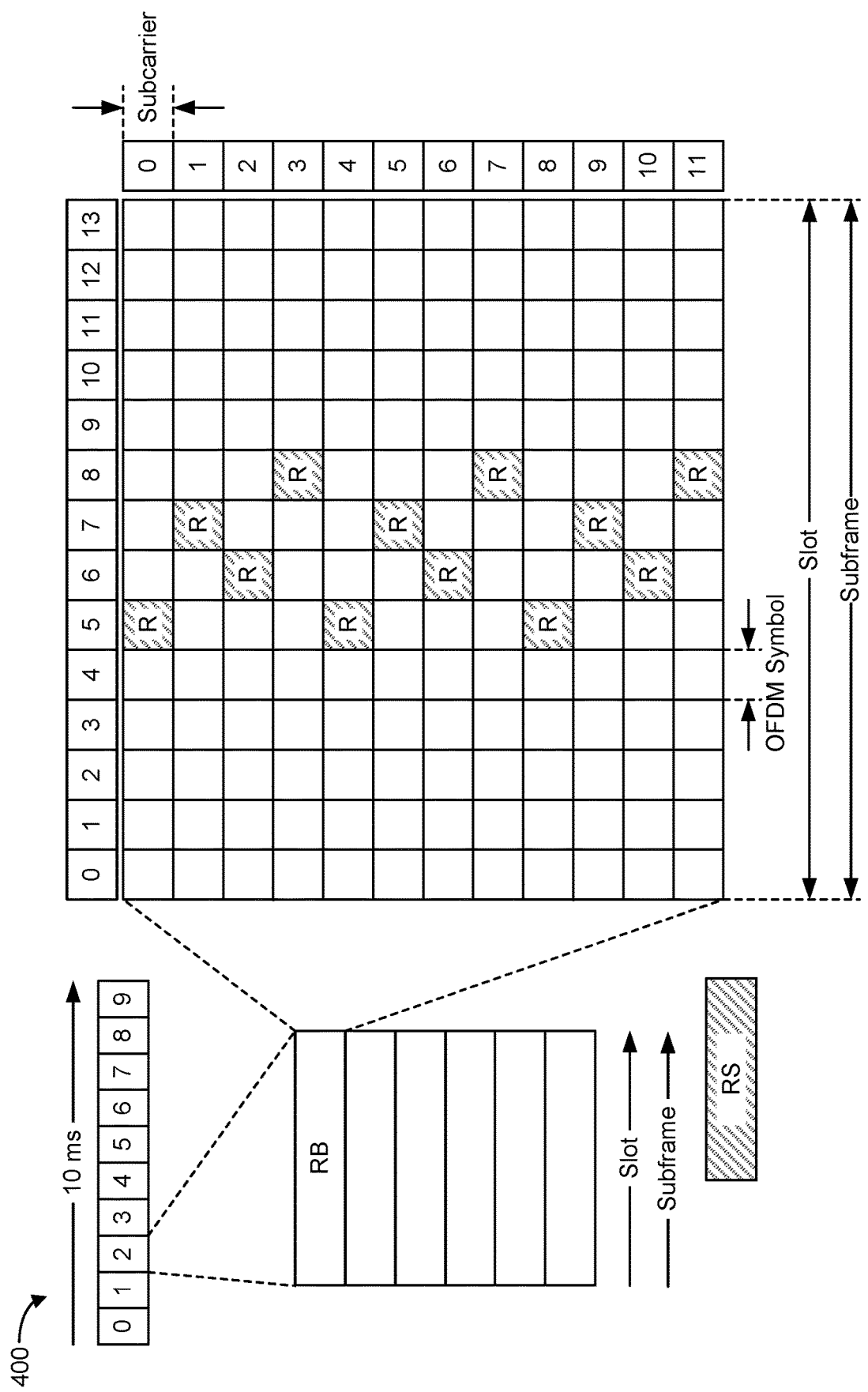
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (u), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu s$), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu s$, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu s$, and the maximum nominal system bandwidth (in MHZ) with a 4K FFT size is 200. For 120 kHz SCS ($\mu=3$), there are eight slots per subframe, 80 slots per frame, the slot duration is 0.125 ms, the symbol duration is 8.33 $\mu s$, and the maximum nominal system bandwidth (in MHZ) with a 4K FFT size is 400. For 240 kHz SCS ($\mu=4$), there are 16 slots per subframe, 160 slots per frame, the slot duration is 0.0625 ms, the symbol duration is 4.17 $\mu s$, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
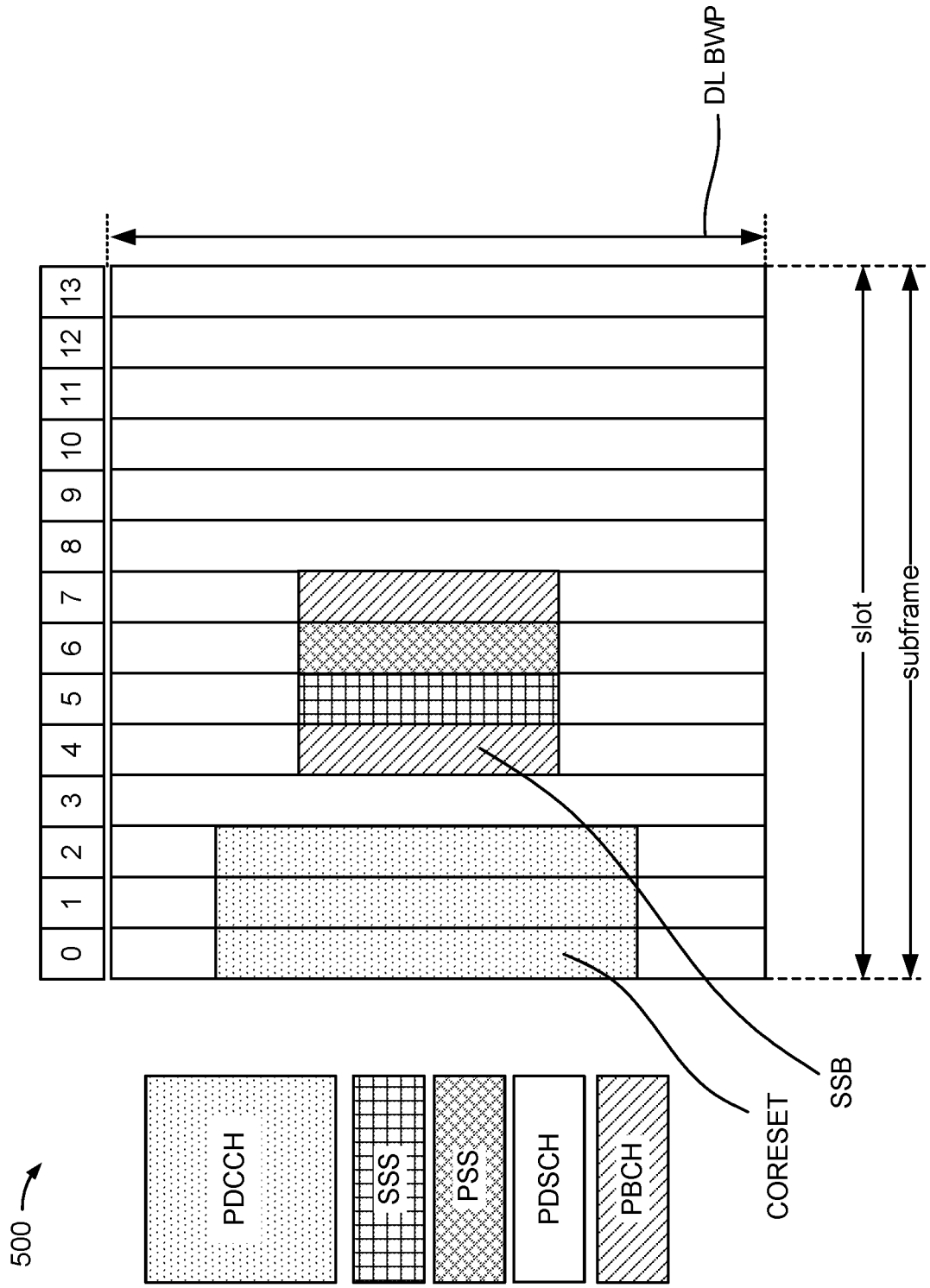
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
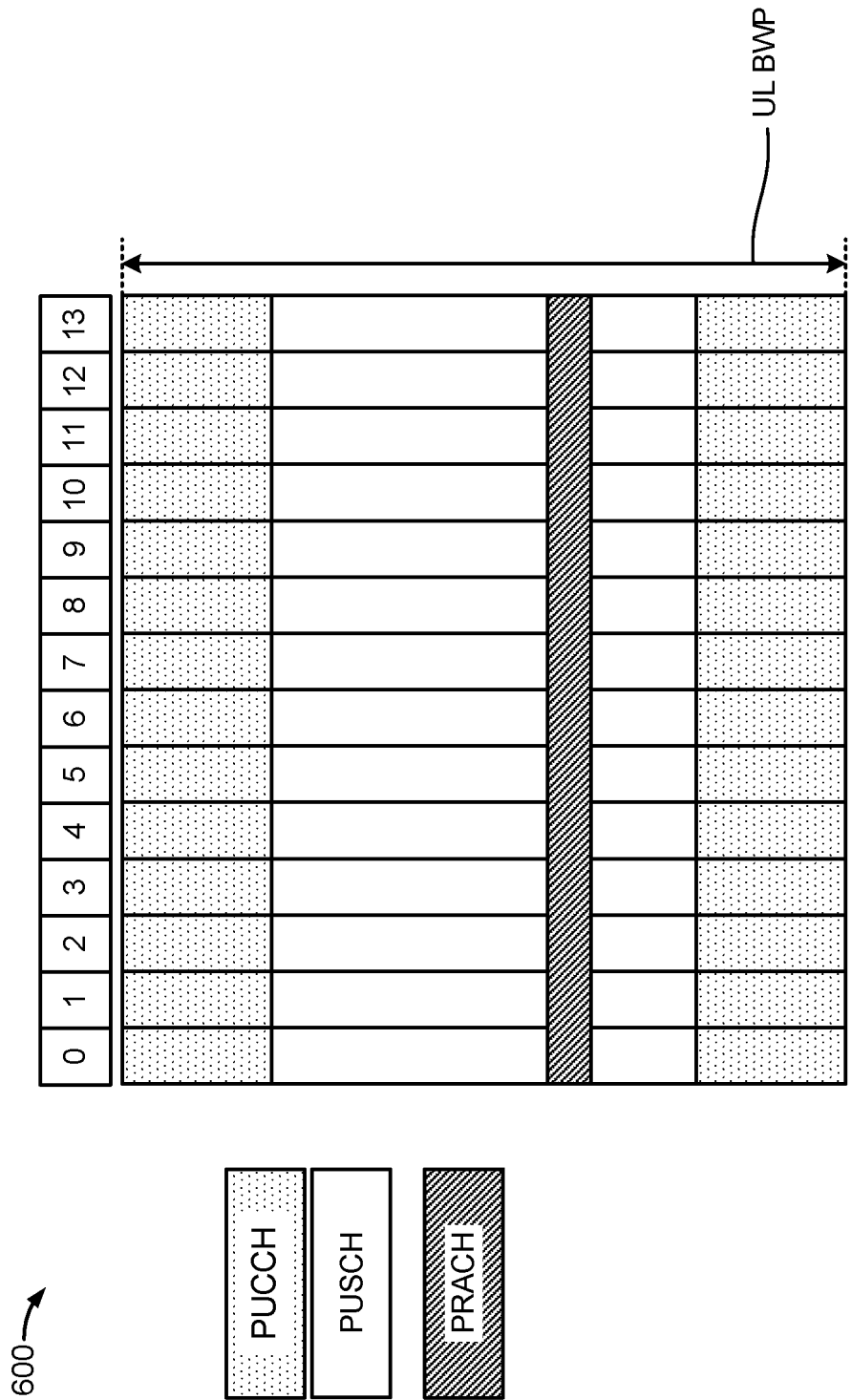
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7:
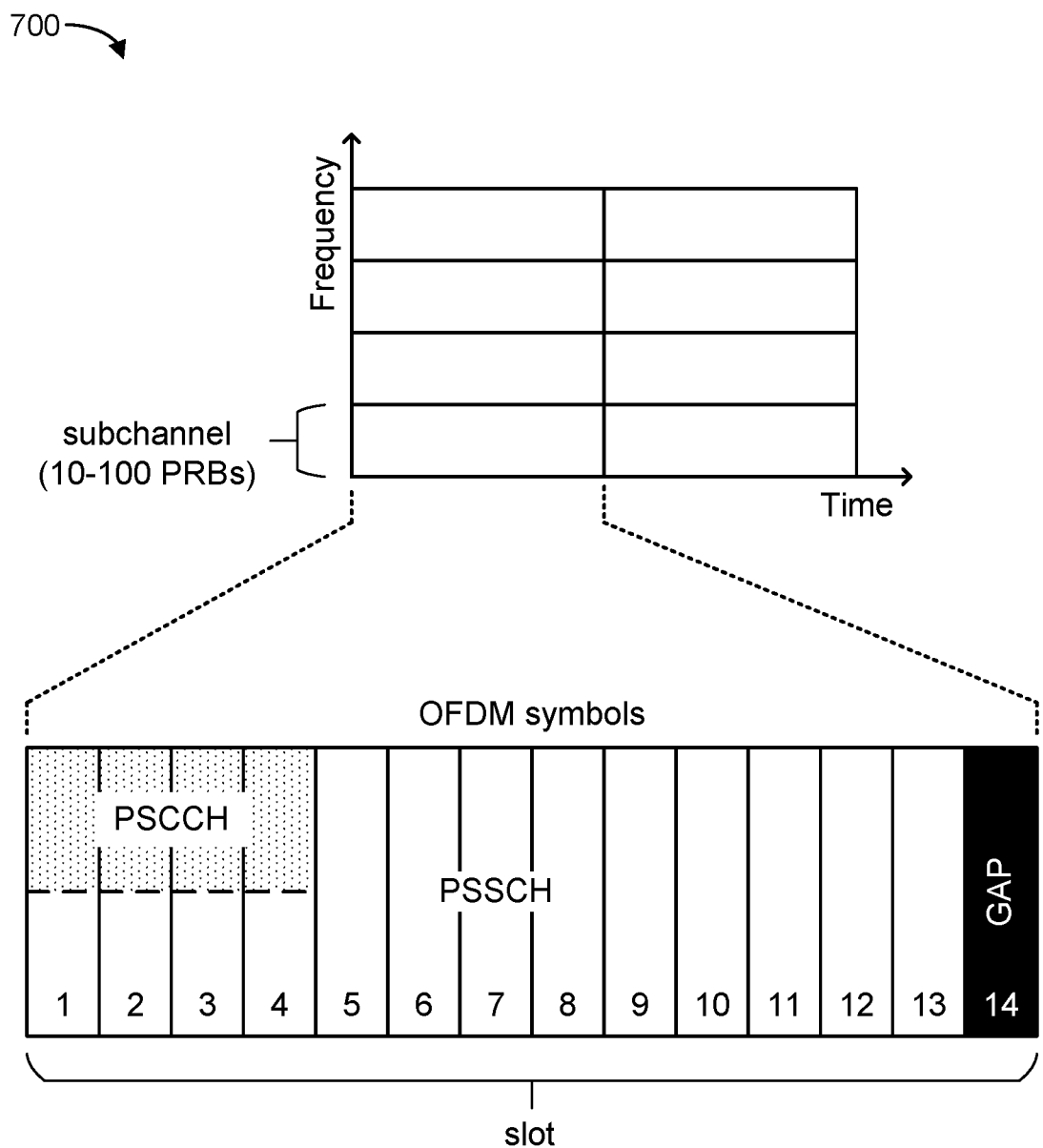
FIG. 7 illustrates time and frequency resources used for sidelink communication.

FIG. 7 illustrates time and frequency resources used for sidelink communication. A time-frequency grid 700 is divided into subchannels in the frequency domain and is divided into time slots in the time domain. Each subchannel comprises a number (e.g., 10, 15, 20, 25, 50, 75, or 100) of physical resource blocks (PRBs), and each slot contains a number (e.g., 14) of OFDM symbols. A sidelink communication can be (pre)configured to occupy fewer than 14 symbols in a slot. The first symbol of the slot is repeated on the preceding symbol for automatic gain control (AGC) settling. The example slot shown in FIG. 4 contains a physical sidelink control channel (PSCCH) portion and a physical sidelink shared channel (PSSCH) portion, with a gap symbol following the PSCCH. PSCCH and PSSCH are transmitted in the same slot.

Sidelink communications take place within transmission or reception resource pools. Sidelink communications occupy one slot and one or more subchannels. Some slots are not available for sidelink, and some slots contain feedback resources. Sidelink communication can be preconfigured (e.g., preloaded on a UE) or configured (e.g., by a base station via RRC).

Figure 8:
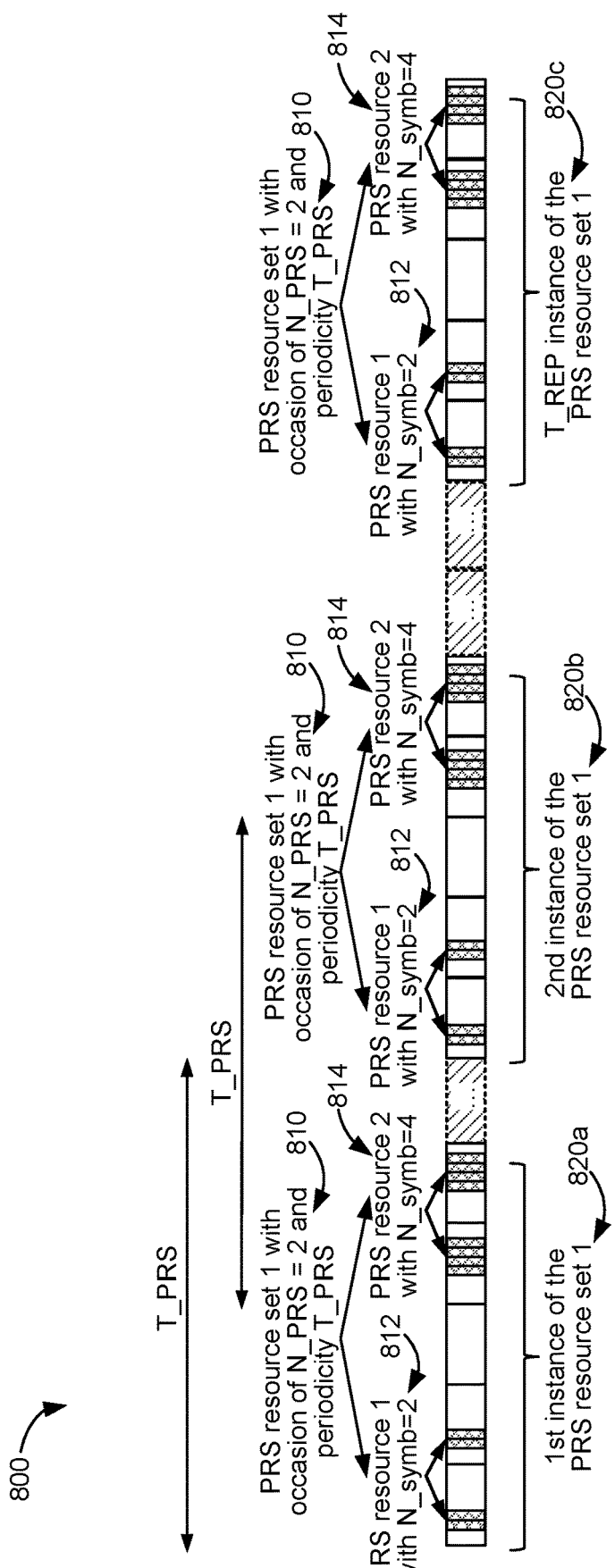
FIG. 8 is a diagram of an example positioning reference signal (PRS) configuration for the PRS transmissions of a given base station, according to aspects of the disclosure.

FIG. 8 is a diagram of an example PRS configuration 800 for the PRS transmissions of a given base station, according to aspects of the disclosure. In FIG. 8, time is represented horizontally, increasing from left to right. Each long rectangle represents a slot and each short (shaded) rectangle represents an OFDM symbol. In the example of FIG. 8, a PRS resource set 810 (labeled "PRS resource set 1") includes two PRS resources, a first PRS resource 812 (labeled "PRS resource 1") and a second PRS resource 814 (labeled "PRS resource 2"). The base station transmits PRS on the PRS resources 812 and 814 of the PRS resource set 810.

The PRS resource set 810 has an occasion length (N_PRS) of two slots and a periodicity (T_PRS) of, for example, 160 slots or 160 milliseconds (ms) (for 15 kHz subcarrier spacing). As such, both the PRS resources 812 and 814 are two consecutive slots in length and repeat every T_PRS slots, starting from the slot in which the first symbol of the respective PRS resource occurs. In the example of FIG. 8, the PRS resource 812 has a symbol length (N_symb) of two symbols, and the PRS resource 814 has a symbol length (N_symb) of four symbols. The PRS resource 812 and the PRS resource 814 may be transmitted on separate beams of the same base station.

Each instance of the PRS resource set 810, illustrated as instances 820a, 820b, and 820c, includes an occasion of length '2' (i.e., N_PRS=2) for each PRS resource 812, 814 of the PRS resource set. The PRS resources 812 and 814 are repeated every T_PRS slots up to the muting sequence periodicity T_REP. As such, a bitmap of length T_REP would be needed to indicate which occasions of instances 820a, 820b, and 820c of PRS resource set 810 are muted (i.e., not transmitted).

In an aspect, there may be additional constraints on the PRS configuration 800. For example, for all PRS resources (e.g., PRS resources 812, 814) of a PRS resource set (e.g., PRS resource set 810), the base station can configure the following parameters to be the same: (a) the occasion length (N_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Figure 9:
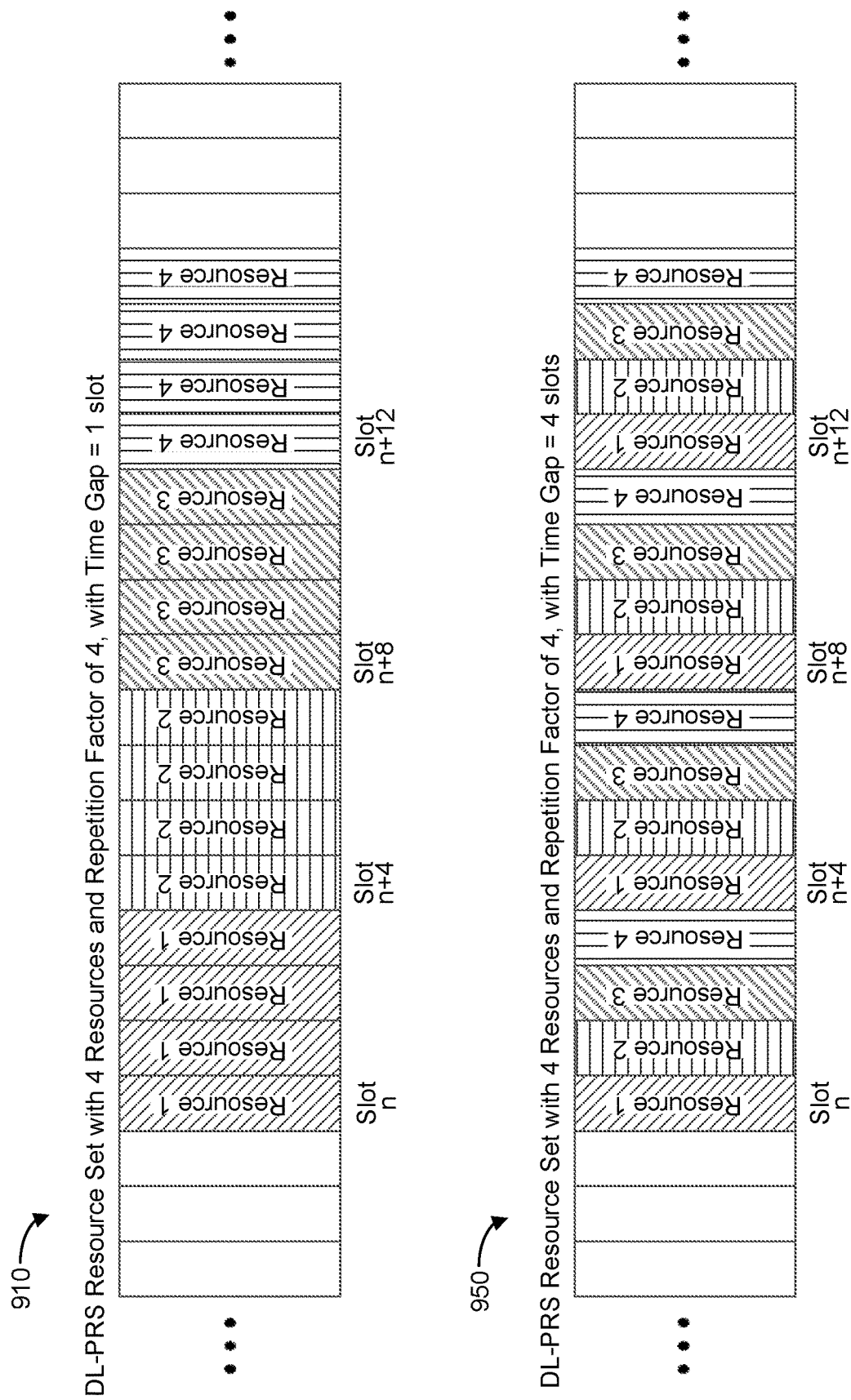
FIG. 9 is a diagram of example positioning reference signal (PRS) resource sets having different time gaps, according to aspects of the disclosure.

FIG. 9 is a diagram of example PRS resource sets having different time gaps, according to aspects of the disclosure. In the example of FIG. 9, time is represented horizontally and frequency is represented vertically. Each block represents a slot in the time domain and some bandwidth in the frequency domain.

FIG. 9 illustrates two DL-PRS resource set configurations, a first DL-PRS resource set configuration 910 and a second DL-PRS resource set configuration 950. Each DL-PRS resource set configuration 910 and 950 comprises four PRS resources (labeled "Resource 1," "Resource 2," "Resource 3," and "Resource 4") and has a repetition factor of four. A repetition factor of four means that each of the four PRS resources is repeated four times (i.e., is transmitted four times) within the DL-PRS resource set. That is, there are four repetitions of each of the four PRS resources within the DL-PRS resource set.

The DL-PRS resource set configuration 910 has a time gap of one slot, meaning that each repetition of a PRS resource (e.g., "Resource 1") starts on the first slot after the previous repetition of that PRS resource. Thus, as illustrated by DL-PRS resource set configuration 910, the four repetitions of each of the four PRS resources are grouped together. Specifically, the four repetitions of PRS resource "Resource 1" occupy the first four slots (i.e., slots n to n+3) of the DL-PRS resource set configuration 910, the four repetitions of PRS resource "Resource 2" occupy the second four slots (i.e., slots n+4 to n+7), the four repetitions of PRS resource "Resource 3" occupy the third four slots (i.e., slots n+8 to n+11), and the four repetitions of PRS resource "Resource 4" occupy the last four slots (i.e., slots n+12 to n+15).

In contrast, the DL-PRS resource set configuration 950 has a time gap of four slots, meaning that each repetition of a PRS resource (e.g., "Resource 2") starts on the fourth slot after the previous repetition of that PRS resource. Thus, as illustrated by DL-PRS resource set configuration 950, the four repetitions of each of the four PRS resources are scheduled every fourth slot. For example, the four repetitions of PRS resource "Resource 1" occupy the first, fifth, ninth, and thirteenth slots (i.e., slots n, n+4, n+8, and n+12) of the DL-PRS resource set configuration 950.

Note that the time duration spanned by one DL-PRS resource set containing repeated DL-PRS resources, as illustrated in FIG. 9, should not exceed the PRS periodicity. In addition, UE receive beam sweeping, for receiving/measuring the DL-PRS resource set, is not specified, but rather, depends on UE implementation.

Figure 10:
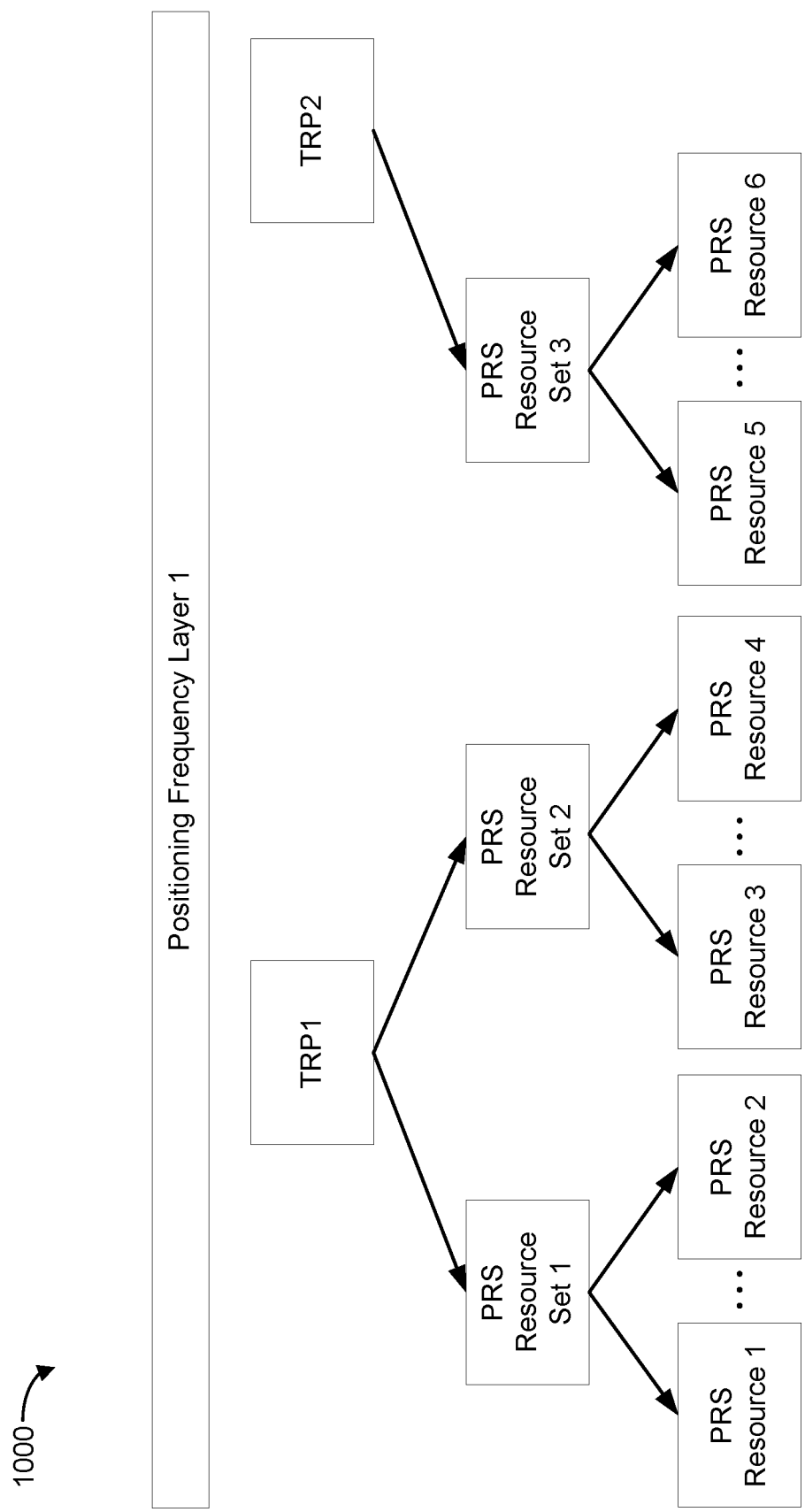
FIG. 10 is a diagram illustrating an example downlink positioning reference signal (DL-PRS) configuration for two transmission-reception points (TRPs) operating in the same positioning frequency layer, according to aspects of the disclosure.

FIG. 10 is a diagram 1000 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 10, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

Figure 11:
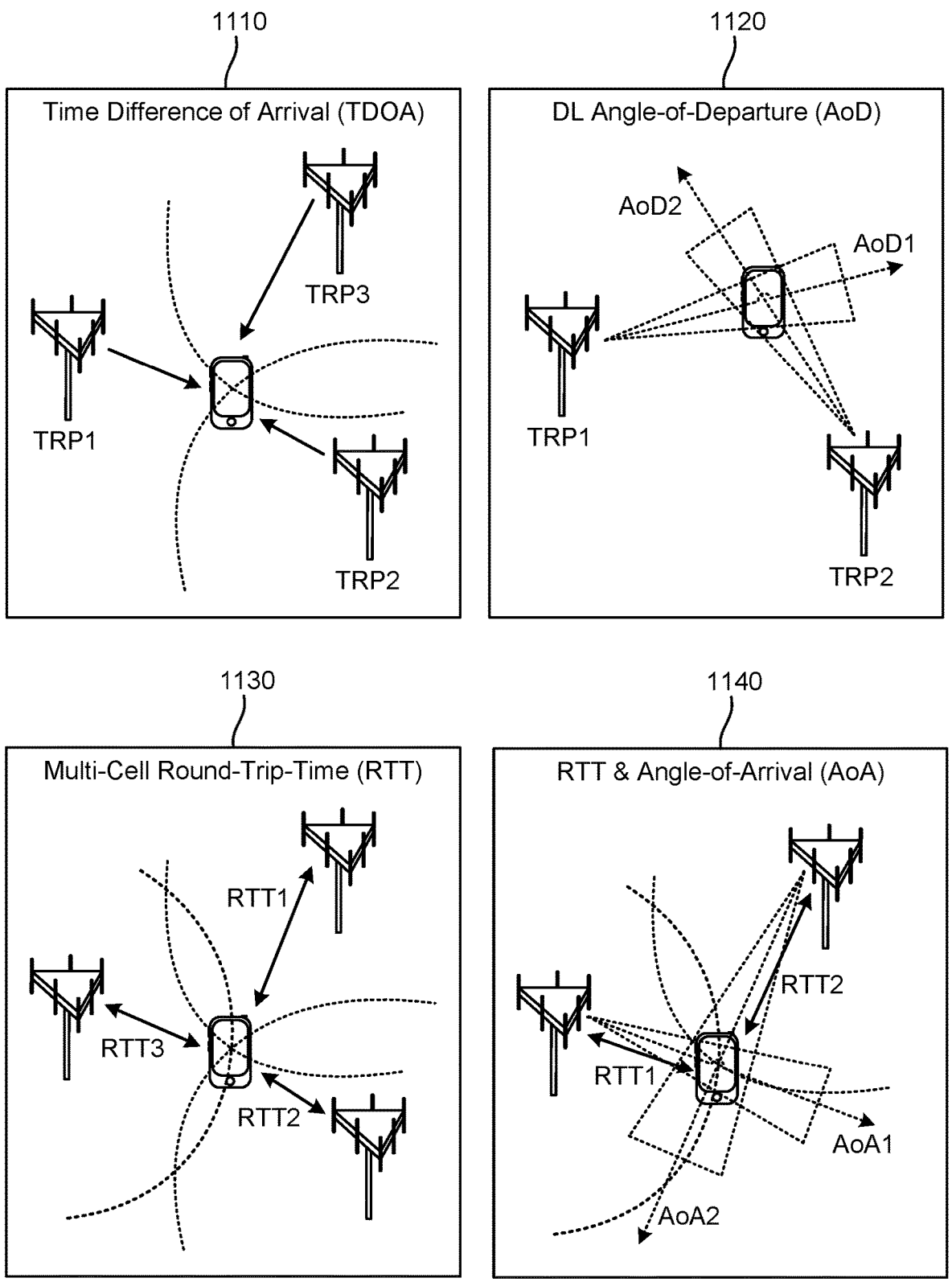
FIG. 11 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 11 illustrates examples of various positioning methods, according to aspects of the disclosure. In an OTDOA or DL-TDOA positioning procedure, illustrated by scenario 1110, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 1120, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 1130, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 1140.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In some designs, for position estimation, UE may report measurement(s) associated with M-samples, each sample is based on one PRS occasion (in some designs, M=4). In the PRS report, one measurement (of one TRP/PRS resource)

can be averaged over multiple samples within one window, where each sample is measured in one PRS occasion. In some designs, the manner in which the sample-specific measurements are combined is left up to UE implementation so long as UE can meet a respective accuracy requirement. In some designs, samples can be combined in frequency domain, time domain or a weighted sum of all the samples. In some designs, UE may report the latest sample, the earliest sample, a mean of all samples, or a median of all samples.

Figure 12:
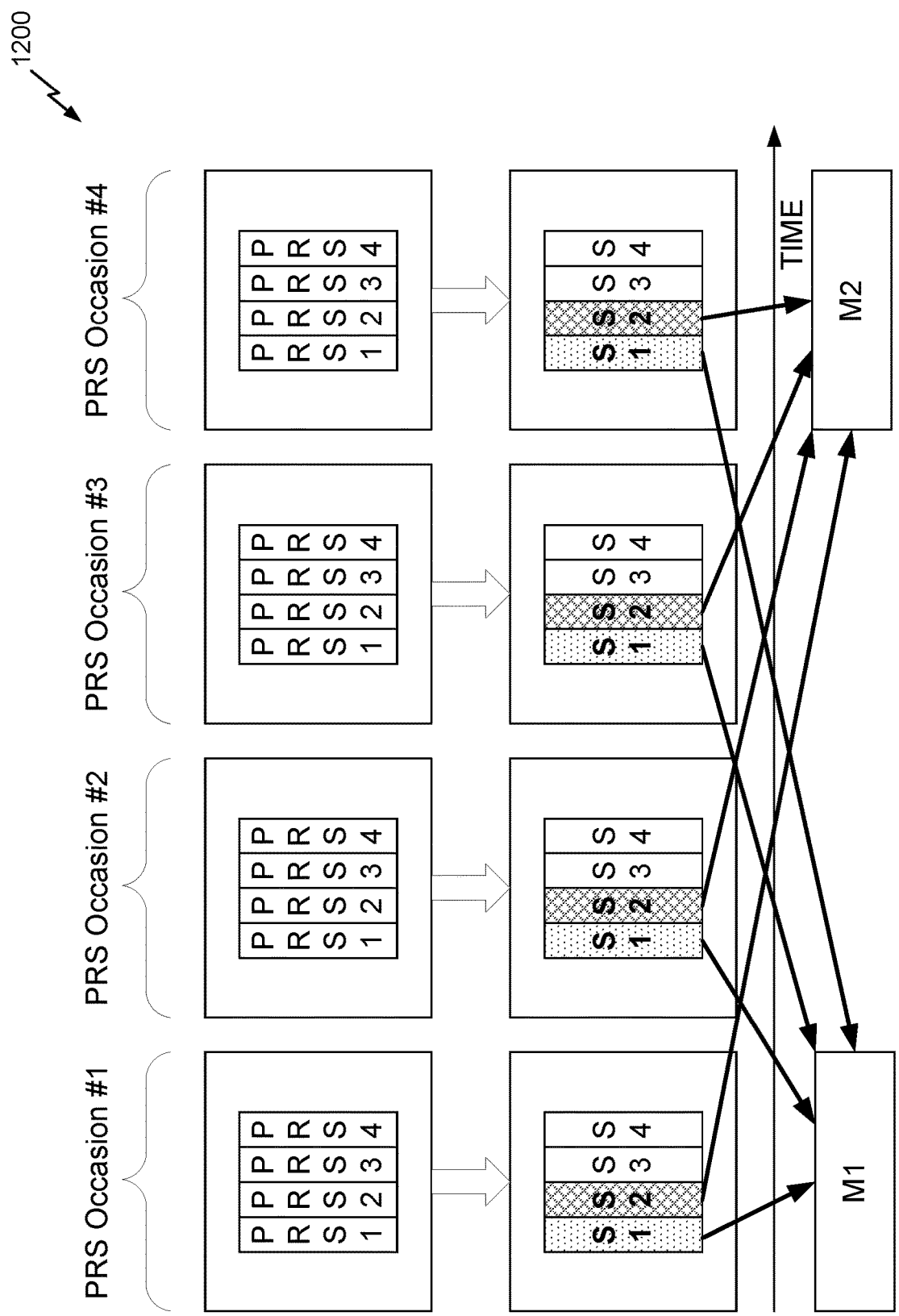
FIG. 12 illustrates a PRS measurement scheme, in accordance with aspects of the disclosure.

FIG. 12 illustrates a PRS measurement scheme 1200, in accordance with aspects of the disclosure. In FIG. 12, a position estimation session includes PRS occasions #1, #2, #3 and #4. PRS occasions #1, #2, #3 and #4 includes four PRS resources 1, 2, 3 and 4, respectively (e.g., each PRS resource may be associated with a different TRP, etc.). At each PRS occasion, PRS resources 1, 2, 3 and 4 may be measured by the UE at respective samples S1, S2, S3 and S4. In FIG. 12, assume that the UE is measuring PRS resources 1 and 2 at S1 and S2 only. In this case, a 'combined' measurement M1 for PRS resource 1 may be reported by the UE based on some combination of four samples S1 across PRS occasions #1, #2, #3 and #4, and a 'combined' measurement M2 for PRS resource 2 may be reported by the UE based on some combination of four samples S2 across PRS occasions #1, #2, #3 and #4. In some designs, the quality of samples may change between PRS occasions during the position estimation session. An example of such a scenario is depicted in FIG. 13.

Figure 13:
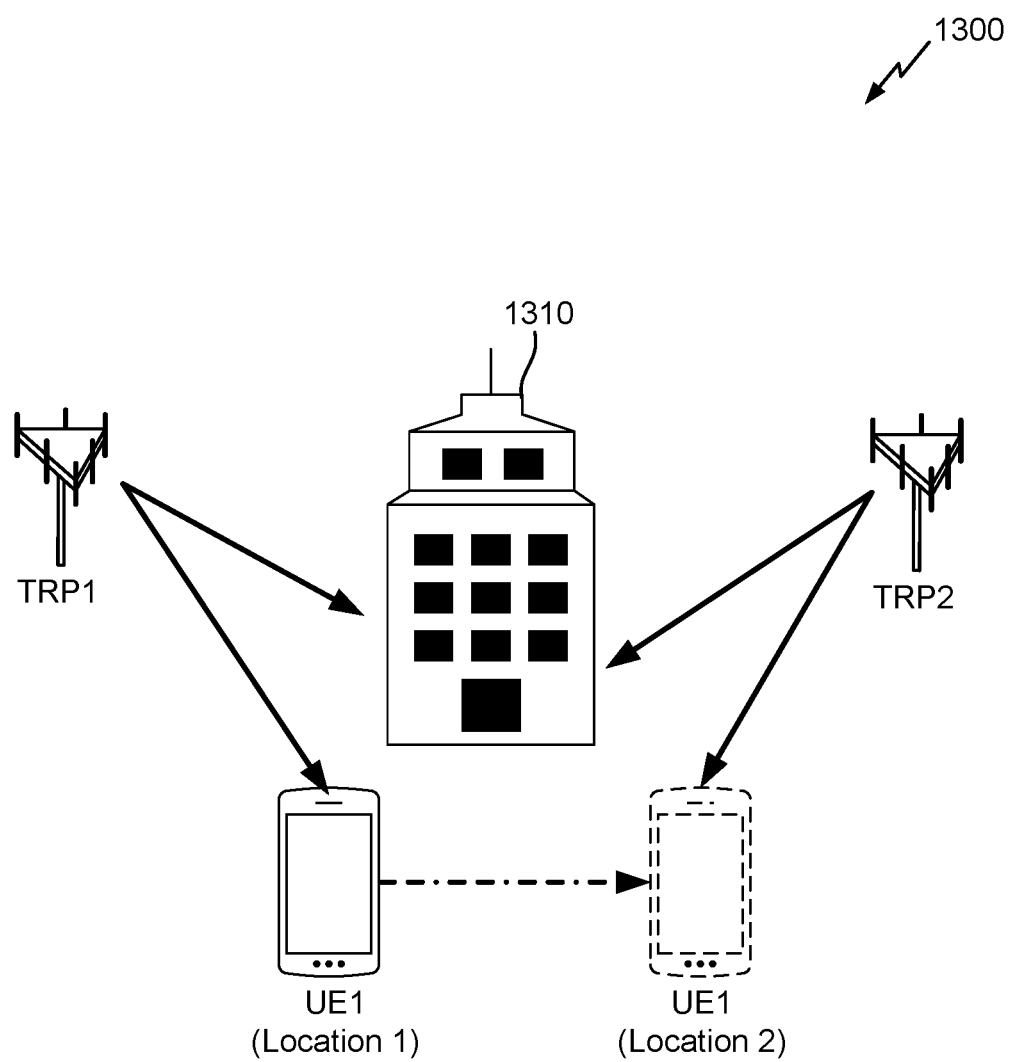
FIG. 13 illustrates a PRS measurement scenario, in accordance with aspects of the disclosure.

FIG. 13 illustrates a PRS measurement scenario 1300, in accordance with aspects of the disclosure. In FIG. 13, assume that TRP1 is associated with PRS resource 1, and TRP2 is associated with PRS resource 2. At t1, UE 1 is located at location 1 in a good reception area for PRS from TRP1. However, while UE 1 is at location 1, UE 1 is in a poor reception area for PRS from TRP2 due to obstruction from a building 1310. Assume that UE 1 is located at or around location 1 for PRS occasions #1 and #2. At t2, assume UE 1 has moved from location 1 to location 2. At this point, location 2 is a good reception area for PRS from TRP2, while being in a poor reception area for PRS from TRP2 due to obstruction from the building 1310. Assume that UE 1 is located at or around location 2 for PRS occasions #3 and #4.

In an example such as FIG. 13, the UE may wish to drop the poor PRS measurements of certain samples from the combined measurement for a respective PRS resource. However, in current systems, the position estimation entity (e.g., LMF) does not know if a particular measurement is based on particular sample(s). Aspects of the disclosure are directed to UE reporting of a measurement report including a combined measurement and an indication of a combination pattern. In particular, the combined measurement is a combination of a subset (e.g., selected by the UE) of a set of samples associated with a set of PRS occasions in accordance with the combination pattern. Such aspects may provide various technical advantages, such as improved position estimation of a target UE.

Figure 14:
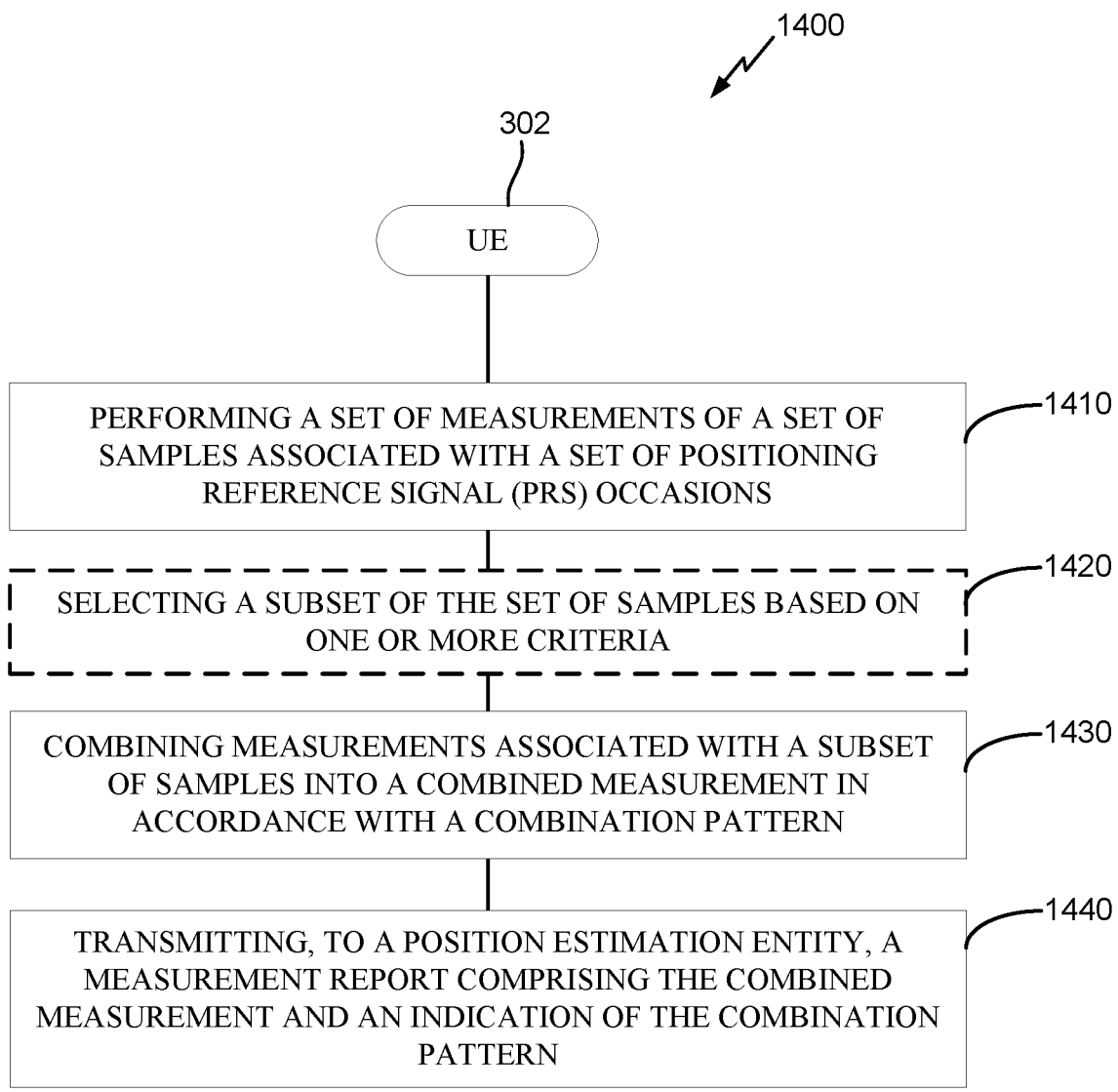
FIG. 14 illustrates an exemplary process of wireless communication, according to aspects of the disclosure.

FIG. 14 illustrates an exemplary process 1400 of wireless communication, according to aspects of the disclosure. In an aspect, the process 1400 may be performed by a UE, such as UE 302.

At 1410, UE 302 (e.g., receiver 312 or 322, processor(s) 332, measurement report component 342, etc.) performs a set of measurements of a set of samples associated with a set of PRS occasions. In some designs, the set of measurements may include measurements associated with TDOA, RSRP, RSTD, RTT (e.g., Rx-Tx, etc.), carrier phase, AoD, AoA, and so on. In some designs, a means for performing the measurement(s) at 1410 may include receiver 312 or 322, processor(s) 332, measurement report component 342, etc., of UE 302.

At 1420, UE 302 (e.g., processor(s) 332, measurement report component 342, etc.) optionally selects a subset of the set of samples based on one or more criteria. In some designs, a means for performing the selection at 1420 may include processor(s) 332, measurement report component 342, etc., of UE 302.

At 1430, UE 302 (e.g., processor(s) 332, measurement report component 342, etc.) combines measurements associated with a subset of samples (e.g., the samples optionally selected at 1420) into a combined measurement in accordance with a combination pattern. In some designs, a means for performing the combining at 1430 may include processor(s) 332, measurement report component 342, etc., of UE 302.

At 1440, UE 302 (e.g., transmitter 314 or 324, data bus 334, etc.) transmits, to a position estimation entity, a measurement report comprising the combined measurement and an indication of the combination pattern. In some designs, if UE 302 itself corresponds to the position estimation entity, the transmission at 1440 may be an internal or logical transfer of the measurement report. In some designs, a means for performing the transmission at 1440 may include transmitter 314 or 324, data bus 334, etc., of UE 302.

Figure 15:
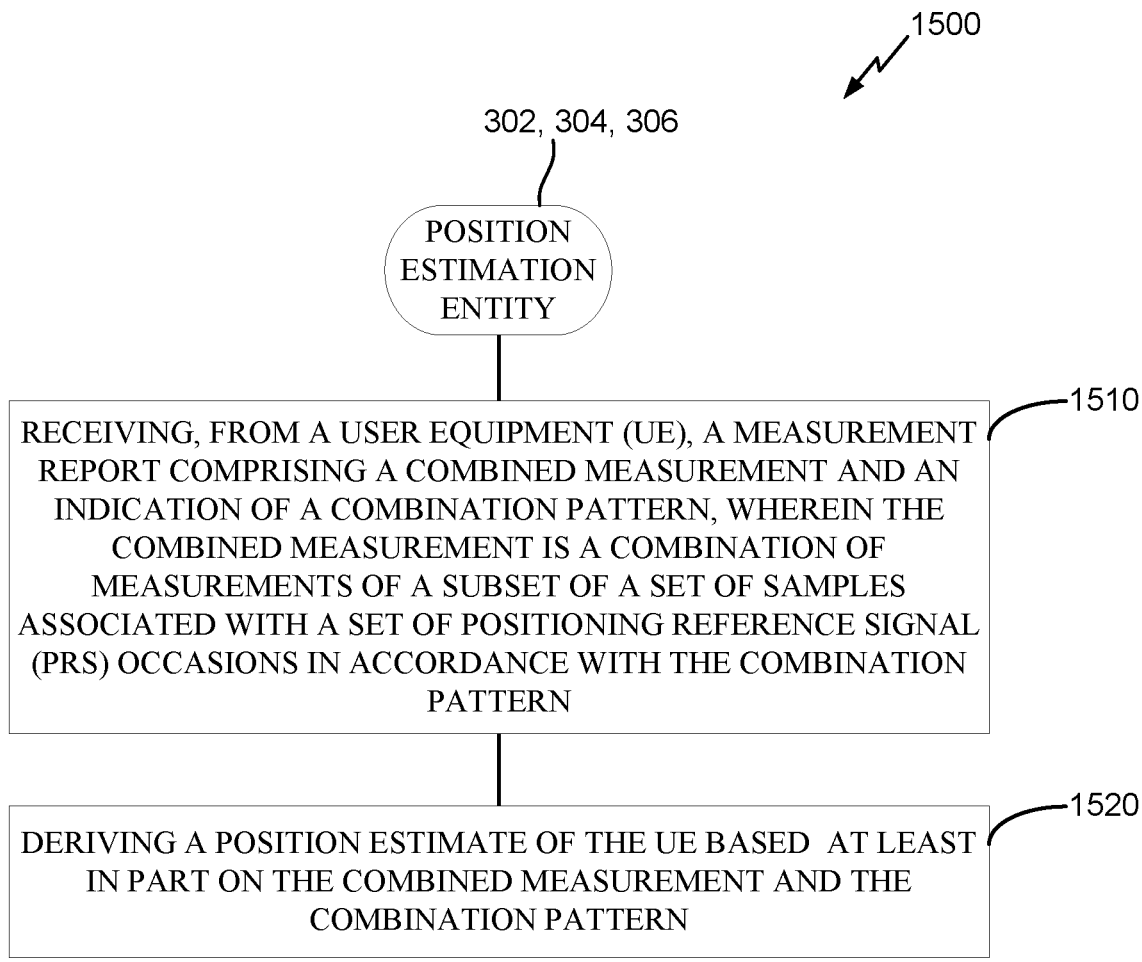
FIG. 15 illustrates an exemplary process of wireless communication, according to aspects of the disclosure.

FIG. 15 illustrates an exemplary process 1500 of wireless communication, according to aspects of the disclosure. In an aspect, the process 1500 may be performed by a position estimation entity, such as UE 302, LMF 306, or BS 304 (e.g., in a scenario where the LMF is integrated with BS 304), location server, etc.

At 1510, the position estimation entity (e.g., receiver 312 or 322 or 352 or 362, network transceiver(s) 380 or 390, processor(s) 332 or 384 or 394, data buses 334 or 382, etc.) receives, from a UE a measurement report comprising a combined measurement and an indication of a combination pattern, wherein the combined measurement is a combination of measurements of a subset of a set of samples associated with a set of PRS occasions in accordance with the combination pattern. In some designs, the combined measurement may include measurements associated with TDOA, RSRP, RSTD, RTT (e.g., Rx-Tx, etc.), carrier phase, AoD, AoA, and so on. In some designs, a means for performing the reception at 1510 may include receiver 312 or 322 or 352 or 362, network transceiver(s) 380 or 390, processor(s) 332 or 384 or 394, data buses 334 or 382, etc., depending on whether the position estimation entity corresponds to UE 302 (e.g., for UE-based position estimation) or BS 304 (e.g., LMF, etc.) or a network entity 306 (e.g., LMF, etc.).

At 1520, the position estimation entity (e.g., processor(s) 332 or 384 or 394, data buses 334 or 382, measurement report component 342 or 388 or 398, etc.) derives a position estimate of the UE based at least in part on the combined measurement and the combination pattern. For example, in some designs, the position estimation entity may derive the position estimate by using combined measurement(s) associated with the same combination pattern first. If this attempt fails, the position estimation entity may then attempt to derive the position estimate based on other measurement(s) that are associated with different combination pattern(s) (e.g., in case of FIG. 16 as discussed below, the position estimation entity may first attempt to derive position estimate based on M1 and M2, and may then consider M3 if the M1+M2 position estimate derivation fails). In some designs, a means for performing the derivation at 1520 may include processor(s) 332 or 384 or 394, data buses 334 or 382, measurement report component 342 or 388 or 398, etc., depending on whether the position estimation entity corresponds to UE 302 (e.g., for UE-based position estimation) or BS 304 (e.g., LMF, etc.) or a network entity 306 (e.g., LMF, etc.).

Referring to FIGS. 14-15, in some designs, the set of samples is associated with multiple TRPs or PRS resources, and the subset of samples is associated with only one of the multiple TRPs or PRS resources.

Referring to FIGS. 14-15, in some designs, the indication of the combination pattern comprises a weight vector. For example, the weight vector may include a set of bits, with each bit indicating whether a respective measurement associated with a corresponding sample of the set of PRS occasions is part of the combined measurement. In some designs, the weight vector may be a weight of integer or float number (e.g., a coefficient that biases a particular sample to emphasize or de-emphasize a particular sample measurement, etc.). In some designs, the indication of the combination pattern comprises a number of samples in the subset of samples, or the indication of the combination pattern comprises a timestamp associated with an earliest of the set of PRS occasions or a latest of the set of PRS occasions, and the indication comprises a PRS occasion range that is offset from the timestamp, or any combination thereof. For example, the timestamp may correspond to the earliest or latest occasion, and the PRS occasion range (e.g., a PRS occasion 'delta') may be used to indicate the range of PRS occasions encompassed by the subset of samples (e.g., in this case, consecutive samples only within the PRS occasion range).

Referring to FIGS. 14-15, in some designs, the subset of samples is associated with one of a plurality of consistency groups. In some designs, information associated with the plurality of consistency groups is received at the UE via assistance data (e.g., LMF provides additional assistance data such as a number of consistency groups for which reporting is permitted, after which the UE performs measurements and associated those measurements with a particular consistency group for reporting purposes), or a number of the plurality of consistency groups is set to less than or equal than a threshold based in part on a length of a time window that spans the set of PRS occasions (e.g., limit the number of consistency group in each window, e.g., only allow a certain number of combination patterns to avoid too many patterns), or at least one consistency group among the plurality of consistency groups is associated with a requirement for a minimum number of samples that contribute to the combined measurement (e.g., at least one consistency group should contain at least Y measurements, which is greater than a minimum number of measurements required for position estimation), or any combination thereof. In some designs, neither the LMF nor the UE may know the consistency group of particular samples or groups of samples in advance (i.e., before the sample is measured). Rather, the UE may determine the consistency group for particular sample(s) after those sample(s) are measured, in some designs.

Referring to FIGS. 14-15, in some designs, the indication of the combination pattern further includes an indication of the one or more criteria by which the subset of samples is selected by the UE. For example, in the measurement report, UE may further indicate the reason(s) the subset of samples was selected instead of using all available samples. Such criteria may include a significant change of RSRP across samples (e.g., above some threshold), or a significant change of ToA across samples (e.g., above some threshold), etc.

Figure 16:
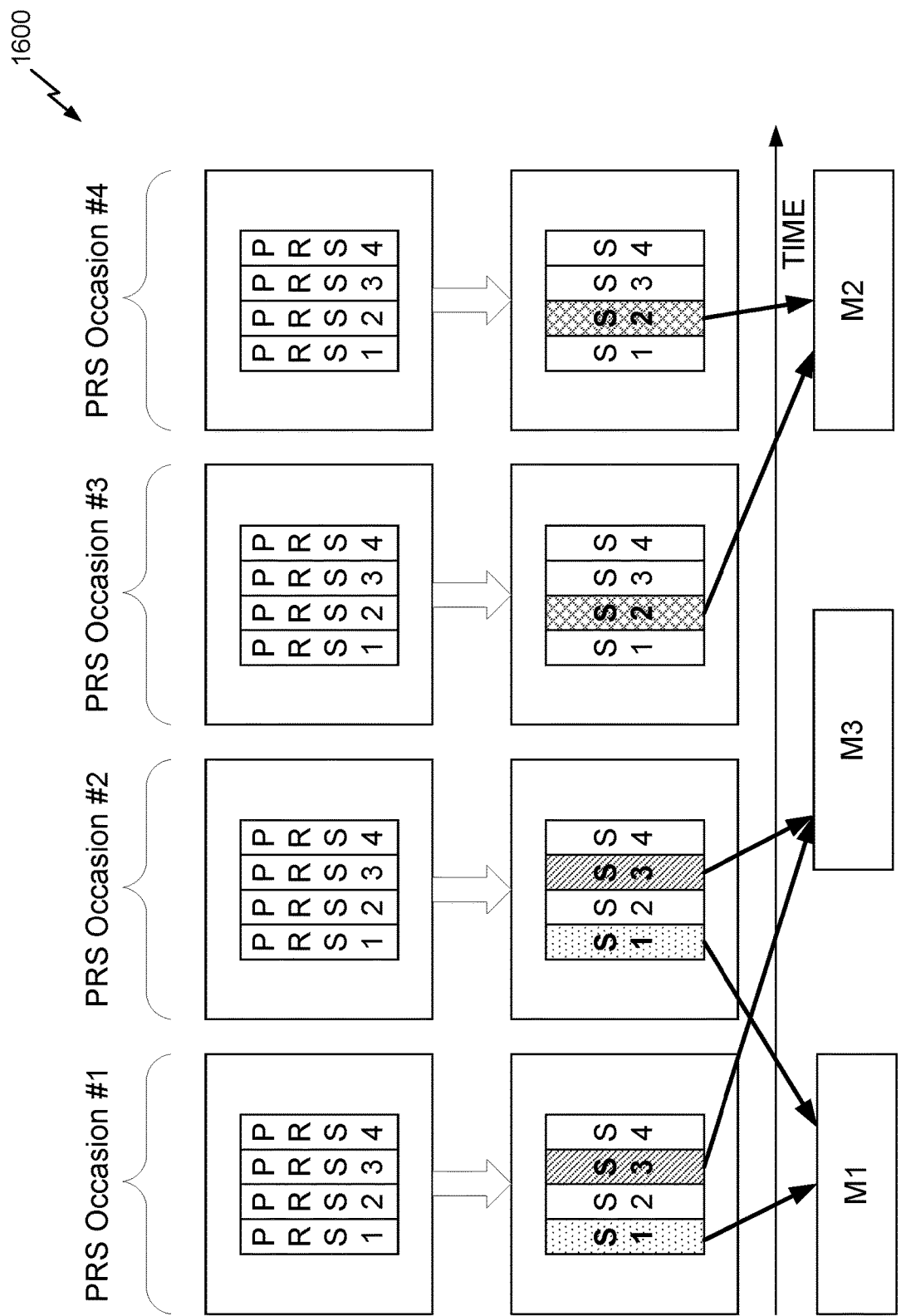
FIG. 16 illustrates a PRS measurement scenario, in accordance with aspects of the disclosure.

FIG. 16 illustrates a PRS measurement scenario 1600, in accordance with aspects of the disclosure. In terms of PRS configuration, the PRS measurement scenario 1600 is similar in some respect to PRS measurement scheme 1200 of FIG. 12. Hence, a position estimation session includes PRS occasions #1, #2, #3 and #4. PRS occasions #1, #2, #3 and #4 includes four PRS resources 1, 2, 3 and 4, respectively (e.g., each PRS resource may be associated with a different TRP, etc.). At each PRS occasion, PRS resources 1, 2, 3 and 4 may be measured by the UE at respective samples S1, S2, S3 and S4. In FIG. 16, assume that the UE measures the samples S1-S4 that each of PRS occasions #1, #2, #3 and #4. Based on these measurements, assume that the UE determines to report combined measurements based only on a particular subset of samples (e.g., samples with lower accuracy may be excluded or de-emphasized via a weight vector). In this case, a 'combined' measurement M1 for PRS resource 1 may be reported by the UE based on some combination of four samples S1 across PRS occasions #1, #2, #3 and #4, a 'combined' measurement M2 for PRS resource 2 may be reported by the UE based on some combination of four samples S2 across PRS occasions #1, #2, #3 and #4, and a 'combined' measurement M1 for PRS resource 3 may be reported by the UE based on some combination of four samples S3 across PRS occasions #1, #2, #3 and #4. In some designs, the quality of samples may change between PRS occasions during the position estimation session.

In the example of FIG. 16, assume that the PRS measurement scenario 1300 occurs, such that UE1 drops samples S1 and S3 for PRS occasions #3 and #4, and that UE1 drops sample S2 for PRS occasions #1 and #2. In this case, via the processes 1400-1500, UE1 may report the combination pattern for PRS resources 1 and 2 (e.g., for PRS resources 1 and 3, the combination pattern would indicate that S1 and S3 were used for PRS occasions #1 and #2 only, and for PRS resource 2, the combination pattern would indicate that S2 was used for PRS occasions #3 and #4 only). As noted above, this scenario may occur where UE is mobile (or non-stationary). In some designs, M1 and M3 may be associated with the same consistency group, which may be indicated to the position estimation entity (e.g., LMF, etc.) via the measurement report as noted above.

In NR, there may not be precise timing synchronization across the network. Instead, it may be sufficient to have coarse time-synchronization across base stations (e.g., within a cyclic prefix (CP) duration of the orthogonal frequency division multiplexing (OFDM) symbols). RTT-based methods generally only need coarse timing synchronization, and as such, are a preferred positioning method in NR.

Figure 17:
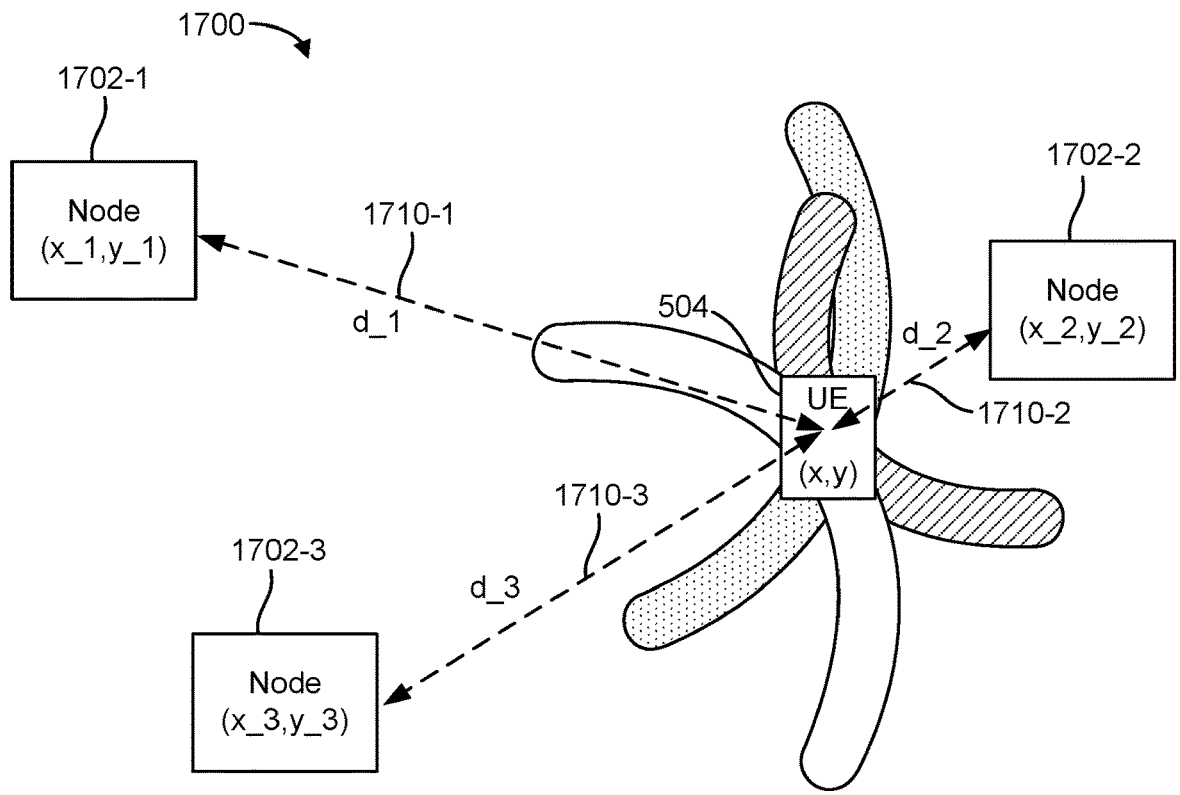
FIG. 17 is a diagram illustrating an example round-trip-time (RTT) procedure for determining a location of a UE, according to aspects of the disclosure.

FIG. 17 illustrates an example wireless communications system 1700, according to aspects of the disclosure. In the example of FIG. 17, a UE 1704 (e.g., any of the UEs described herein) is attempting to calculate an estimate of its location, or assist another entity (e.g., a base station or core network component, another UE, a location server, a third party application, etc.) to calculate an estimate of its location. The UE 1704 may transmit and receive wireless signals to and from a plurality of network nodes (labeled "Node") 1702-1, 1702-2, and 1702-3 (collectively, network nodes 1702). The network nodes 1702 may include one or more base stations (e.g., any of the base stations described herein), one or more reconfigurable intelligent displays (RIS), one or more positioning beacons, one or more UEs (e.g., connected over sidelinks), etc.

In a network-centric RTT positioning procedure the serving base station (e.g., one of network nodes 1702) instructs the UE 1704 to measure RTT measurement signals (e.g., PRS) from two or more neighboring network nodes 1702 (and typically the serving base station, as at least three network nodes 1702 are needed for a two-dimensional location estimate). The involved network nodes 1702 transmit RTT measurement signals on low reuse resources (e.g., resources used by the network nodes 1702 to transmit system information, where the network nodes 1702 are base stations) allocated by the network (e.g., location server 230, LMF 270, SLP 272). The UE 1704 records the arrival time (also referred to as the receive time, reception time, time of reception, or time of arrival) of each RTT measurement signal relative to the UE's 1704 current downlink timing (e.g., as derived by the UE 1704 from a downlink signal received from its serving base station), and transmits a common or individual RTT response signal (e.g., SRS) to the involved network nodes 1702 on resources allocated by its serving base station. The UE 1704, if it not the positioning entity, reports a UE reception-to-transmission (Rx-Tx) time difference measurement to the positioning entity. The UE Rx-Tx time difference measurement indicates the time difference between the arrival time of each RTT measurement signal at the UE 1704 and the transmission time(s) of the RTT response signal(s). Each involved network node 1702 also reports, to the positioning entity, a network node Rx-Tx time difference measurement (also referred to as a base station (BS) or gNB Rx-Tx time difference measurement), which indicates the difference between the transmission time of the RTT measurement signal and the reception time of the RTT response signal.

A UE-centric RTT positioning procedure is similar to the network-based procedure, except that the UE 1704 transmits uplink RTT measurement signal(s) (e.g., on resources allocated by the serving base station). The uplink RTT measurement signal(s) are measured by multiple network nodes 1702 in the neighborhood of the UE 1704. Each involved network node 1702 responds with a downlink RTT response signal and reports a network node Rx-Tx time difference measurement to the positioning entity. The network node Rx-Tx time difference measurement indicates the time difference between the arrival time of the RTT measurement signal at the network node 1702 and the transmission time of the RTT response signal. The UE 1704, if it is not the positioning entity, reports, for each network node 1702, a UE Rx-Tx time difference measurement that indicates the difference between the transmission time of the RTT measurement signal and the reception time of the RTT response signal.

In order to determine the location (x, y) of the UE 1704, the positioning entity needs to know the locations of the network nodes 1702, which may be represented in a reference coordinate system as (x_k, y_y), where k=1, 2, 3 in the example of FIG. 17. Where the UE 1704 is the positioning entity, a location server with knowledge of the network geometry (e.g., location server 230, LMF 270, SLP 272) may provide the locations of the involved network nodes 1702 to the UE 1704.

The positioning entity determines each distance 1710 (d_k, where k=1, 2, 3) between the UE 1704 and the respective network node 1702 based on the UE Rx-Tx and network node Rx-Tx time difference measurements and the speed of light, as described further below with reference to FIG. 18. Specifically, in the example of FIG. 17, the distance 1710-1 between the UE 1704 and the network node 1702-1 is d_1, the distance 1710-2 between the UE 1704 and the network node 1702-2 is d_2, and the distance 1710-3 between the UE 1704 and the network node 1702-3 is d_3. Once each distance 1710 is determined, the positioning entity can solve for the location (x, y) of the UE 1704 by using a variety of known geometric techniques, such as trilateration. From FIG. 17, it can be seen that the location of the UE 1704 ideally lies at the common intersection of three semicircles, each semicircle being defined by radius dk and center (x_k, y_k), where k=1, 2, 3.

Figure 18:
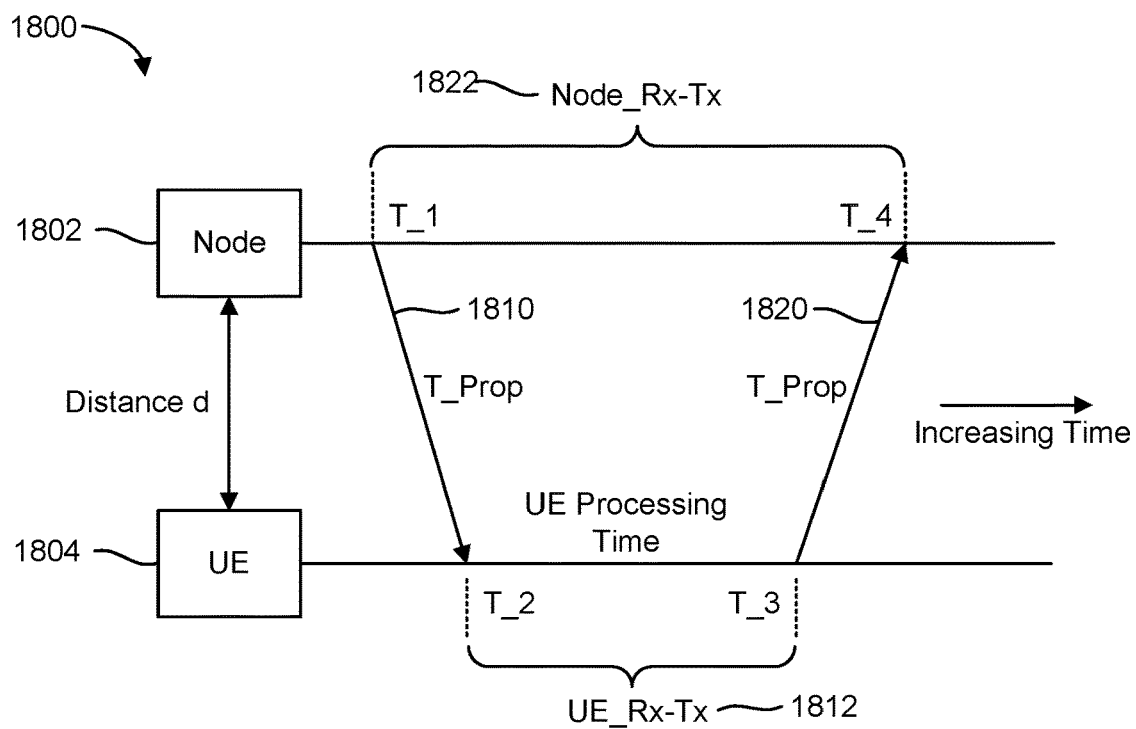
FIG. 18 is a diagram showing example timings of RTT measurement signals exchanged between a base station and a UE, according to aspects of the disclosure.

FIG. 18 is a diagram 1800 showing example timings of RTT measurement signals exchanged between a network node 1802 (labeled "Node") and a UE 1804, according to aspects of the disclosure. The UE 1804 may be any of the UEs described herein. The network node 1802 may be a base station (e.g., any of the base stations described herein), an RIS, a positioning beacon, another UE (e.g., connected over a sidelink), or the like.

In the example of FIG. 18, the network node 1802 (labeled "BS") sends an RTT measurement signal 1810 (e.g., PRS) to the UE 1804 at time T_1. The RTT measurement signal 1810 has some propagation delay T_Prop as it travels from the network node 1802 to the UE 1804. At time T_2 (the reception time of the RTT measurement signal 1810 at the UE 1804), the UE 1804 measures the RTT measurement signal 1810. After some UE processing time, the UE 1804 transmits an RTT response signal 1820 (e.g., SRS) at time T_3. After the propagation delay T_Prop, the network node 1802 measures the RTT response signal 1820 from the UE 1804 at time T_4 (the reception time of the RTT response signal 1820 at the network node 1802).

The UE 1804 reports the difference between time T_3 and time T_2 (i.e., the UE's 1804 Rx-Tx time difference measurement, shown as UE_Rx-Tx 1812) to the positioning entity. Similarly, the network node 1802 reports the difference between time T_4 and time T_1 (i.e., the network node's 1802 Rx-Tx time difference measurement, shown as Node_Rx-Tx 1822) to the positioning entity. Using these measurements and the known speed of light, the positioning entity can calculate the distance to the UE 1804 as d=1/2*c*(Node_Rx-Tx−UE_Rx-Tx)=1/2*c*(T_4−T_1)−1/2*c*(T_3−T_2), where c is the speed of light.

Based on the known location of the network node 1802 and the distance between the UE 1804 and the network node 1802 (and at least two other network nodes 1802), the positioning entity can calculate the location of the UE 1804. As shown in FIG. 17, the location of the UE 1804 lies at the common intersection of three semicircles, each semicircle being defined by a radius of the distance between the UE 1804 and a respective network node 1802.

In an aspect, the positioning entity may calculate the UE's 1704/1804 location using a two-dimensional coordinate system; however, the aspects disclosed herein are not so limited, and may also be applicable to determining locations using a three-dimensional coordinate system, if the extra dimension is desired. Additionally, while FIG. 17 illustrates one UE 1704 and three network nodes 1702 and FIG. 18 illustrates one UE 1804 and one network node 1802, as will be appreciated, there may be more UEs 1704/1804 and more network nodes 1702/1802.

Figure 19:
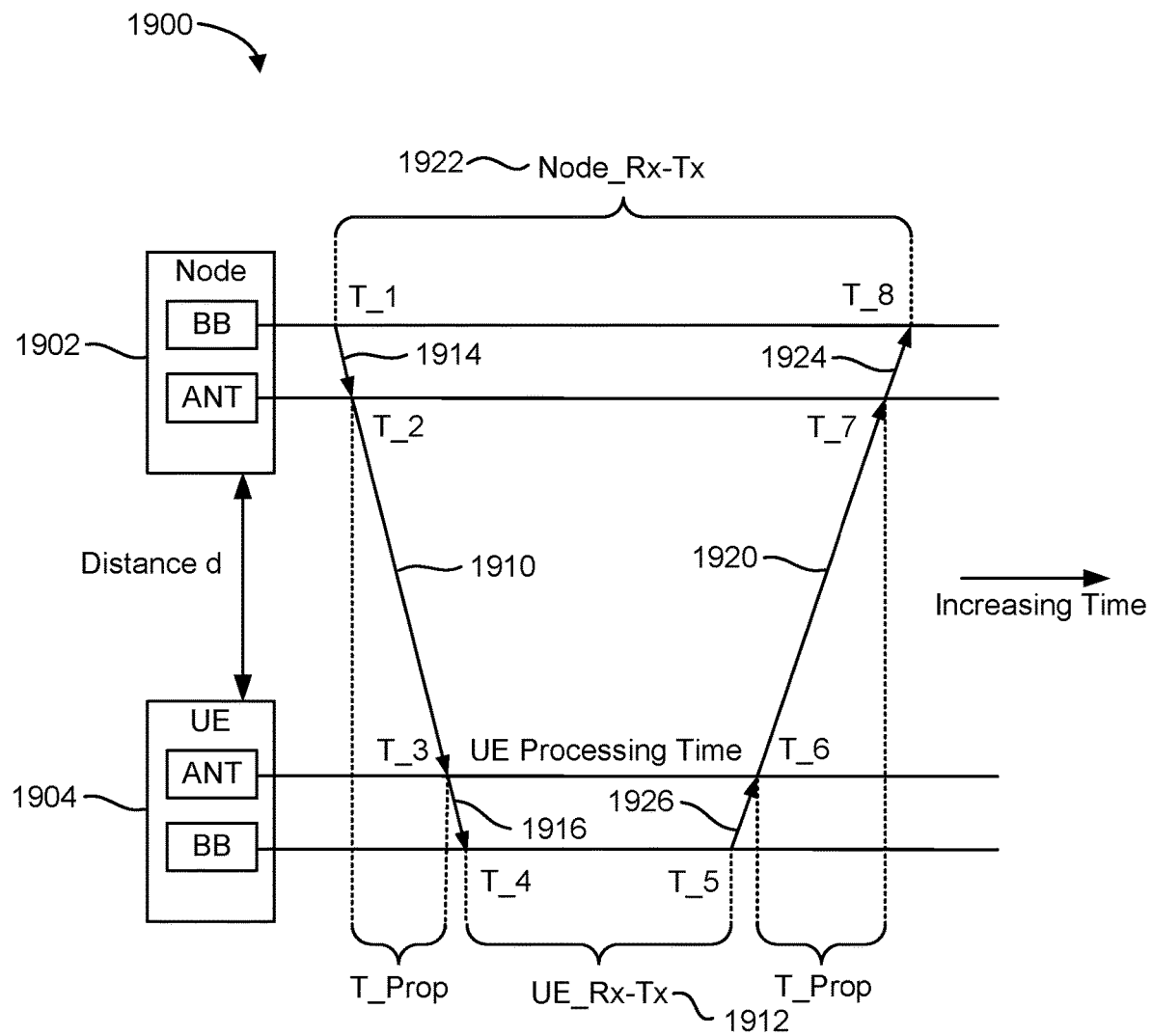
FIG. 19 is a diagram illustrating example timings of RTT measurement signals exchanged between a base station and a UE, according to aspects of the disclosure.

FIG. 19 is a diagram 1900 showing example timings of RTT measurement signals exchanged between a network node 1902 and a UE 1904, according to aspects of the disclosure. The diagram 1900 is similar to the diagram 1800, except that it includes processing delays that may occur at both the network node 1902 (labeled "Node") and the UE 1904 when transmitting and receiving the RTT measurement and response signals. The network node 1902 may be a base station (e.g., any of the base stations), an RIS (e.g., RIS 410), another UE (e.g., any of the UEs described herein), or other network node capable of performing an RTT positioning procedure. As a specific example, the network node 1902 and the UE 1904 may correspond to the network node 1802 and the UE 1804 in FIG. 18.

Referring now to potential processing delays, at the network node 1902, there is a transmission delay 1914 between the time T_1 that the network node's 1902 baseband (labeled "BB") generates the RTT measurement signal 1910 (e.g., a PRS) and the time T_2 that the network node's 1902 antenna(s) (labeled "Ant") transmit the RTT measurement signal 1910. At the UE 1904, there is a reception delay 1916 between the time T_3 that the UE's 604 antenna(s) (labeled "Ant") receive the RTT measurement signal 1910 and the time T_4 that the UE's 1904 baseband (labeled "BB") processes the RTT measurement signal 1910.

Similarly, for the RTT response signal 1920 (e.g., an SRS), there is a transmission delay 1926 between the time T_5 that the UE's 1904 baseband generates the RTT response signal 1920 and the time T_6 that the UE's 1904 antenna(s) transmit the RTT response signal 1920. At the network node 1902, there is a reception delay 1924 between the time T_7 that the network node's 1902 antenna(s) receive the RTT response signal 1920 and the time T_8 that the network node's 1902 baseband processes the RTT response signal 1920.

The difference between times T_2 and T_1 (i.e., transmission delay 1914) and times T_8 and T_7 (i.e., reception delay 1924) is referred to as the network node's 1902 "group delay." The difference between times T_4 and T_3 (i.e., reception delay 1916) and times T_6 and T_5 (i.e., transmission delay 1926) is referred to as the UE's 1904 "group delay." The group delay includes a hardware group delay, a group delay attributable to software/firmware, or both. More specifically, although software and/or firmware may contribute to group delay, the group delay is primarily due to internal hardware delays between the baseband and the antenna(s) of the network node 1902 and the UE 1904.

As shown in FIG. 19, because of the reception delay 1916 and the transmission delay 1926, the UE's 1904 Rx-Tx time difference measurement 1912 does not represent the difference between the actual reception time at time T_3 and the actual transmission time at time T_6. Similarly, because of the transmission delay 1914 and the reception delay 1924, the network node's 1902 Rx-Tx time difference measurement 1922 does not represent the difference between the actual transmission time at time T_2 and the actual reception time at time T_7. Thus, as shown, group delays, such as reception delays 1916 and 1924 and transmission delays 1914 and 1926, can contribute to timing errors and/or calibration errors that can impact RTT measurements, as well as other measurements, such as TDOA, RSTD, etc. This can in turn can impact positioning performance. For example, in some designs, a 10 ns error will introduce three meters of error in the final location estimate.

In some cases, the UE 1904 can calibrate its group delay and compensate for it so that the UE Rx-Tx time difference measurement 1912 reflects the actual reception and transmission times from its antenna(s). Alternatively, the UE 1904 can report its group delay to the positioning entity (if not the UE 1904), which can then subtract the group delay from the UE Rx-Tx time difference measurement 1912 when determining the final distance between the network node 1902 and the UE 1904. Similarly, the network node 1902 may be able to compensate for its group delay in the network node Rx-Tx time difference measurement 1922, or simply report the group delay to the positioning entity.

The following definitions are used for the purpose of describing internal timing errors:

Transmit (Tx) timing error: From a signal transmission perspective, there is a time delay from the time when the digital signal is generated at the baseband to the time when the RF signal is transmitted from the transmit antenna. For supporting positioning, the UE/TRP may implement an internal calibration/compensation of the transmit time delay for the transmission of the DL-PRS/UL-SRS, which may also include the calibration/compensation of the relative time delay between different RF chains in the same UE/TRP. The compensation may also consider the offset of the transmit antenna phase center to the physical antenna center. However, the calibration may not be perfect. The remaining transmit time delay after the calibration, or the uncalibrated transmit time delay is defined as the "transmit timing error" or "Tx timing error."

Receive (Rx) timing error: From a signal reception perspective, there is a time delay from the time when the RF signal arrives at the Rx antenna to the time when the signal is digitized and time-stamped at the baseband. For supporting positioning, the UE/TRP may implement an internal calibration/compensation of the Rx time delay before it reports the measurements that are obtained from the DL-PRS/SRS, which may also include the calibration/compensation of the relative time delay between different RF chains in the same UE/TRP. The compensation may also consider the offset of the Rx antenna phase center to the physical antenna center. However, the calibration may not be perfect. The remaining Rx time delay after the calibration, or the uncalibrated Rx time delay, is defined as the "Rx timing error."

UE Tx timing error group (TEG): A UE Tx TEG (or TxTEG) is associated with the transmissions of one or more SRS resources for the positioning purpose, which have the Tx timing errors within a certain margin (e.g., within a threshold of each other).

TRP Tx TEG: A TRP Tx TEG (or TxTEG) is associated with the transmissions of one or more DL-PRS resources, which have the Tx timing errors within a certain margin.

UE Rx TEG: A UE Rx TEG (or RxTEG) is associated with one or more downlink measurements, which have the Rx timing errors within a certain margin.

TRP Rx TEG: A TRP Rx TEG (or RxTEG) is associated with one or more uplink measurements, which have the Rx timing errors within a margin.

UE Rx-Tx TEG: A UE Rx-Tx TEG (or RxTxTEG) is associated with one or more UE Rx-Tx time difference measurements, and one or more SRS resources for the positioning purpose, which have the Rx timing errors plus Tx timing errors within a certain margin.

TRP Rx-Tx TEG: A TRP Rx-Tx TEG (or RxTxTEG) is associated with one or more TRP Rx-Tx time difference measurements and one or more DL-PRS resources, which have the Rx timing errors plus Tx timing errors within a certain margin.

In some designs as noted above, a combined measurement may be based upon measurements of multiple samples across PRS occasions of a position estimation session. In some designs, two or more of the multiple samples in the combined measurement may be associated with different calibration errors (e.g., different TEGs). In this case, it may be difficult for the UE to report the calibration error for the combined measurement. Aspects of the disclosure are directed to UE reporting of a measurement report including a combined measurement and an indication of a combined calibration error associated with the combined measurement. In particular, the combined measurement is a combination of measurements of a subset of a set of samples associated with a set of PRS occasions in accordance with a combination pattern. Such aspects may provide various technical advantages, such as improved position estimation of a target UE.

Figure 20:
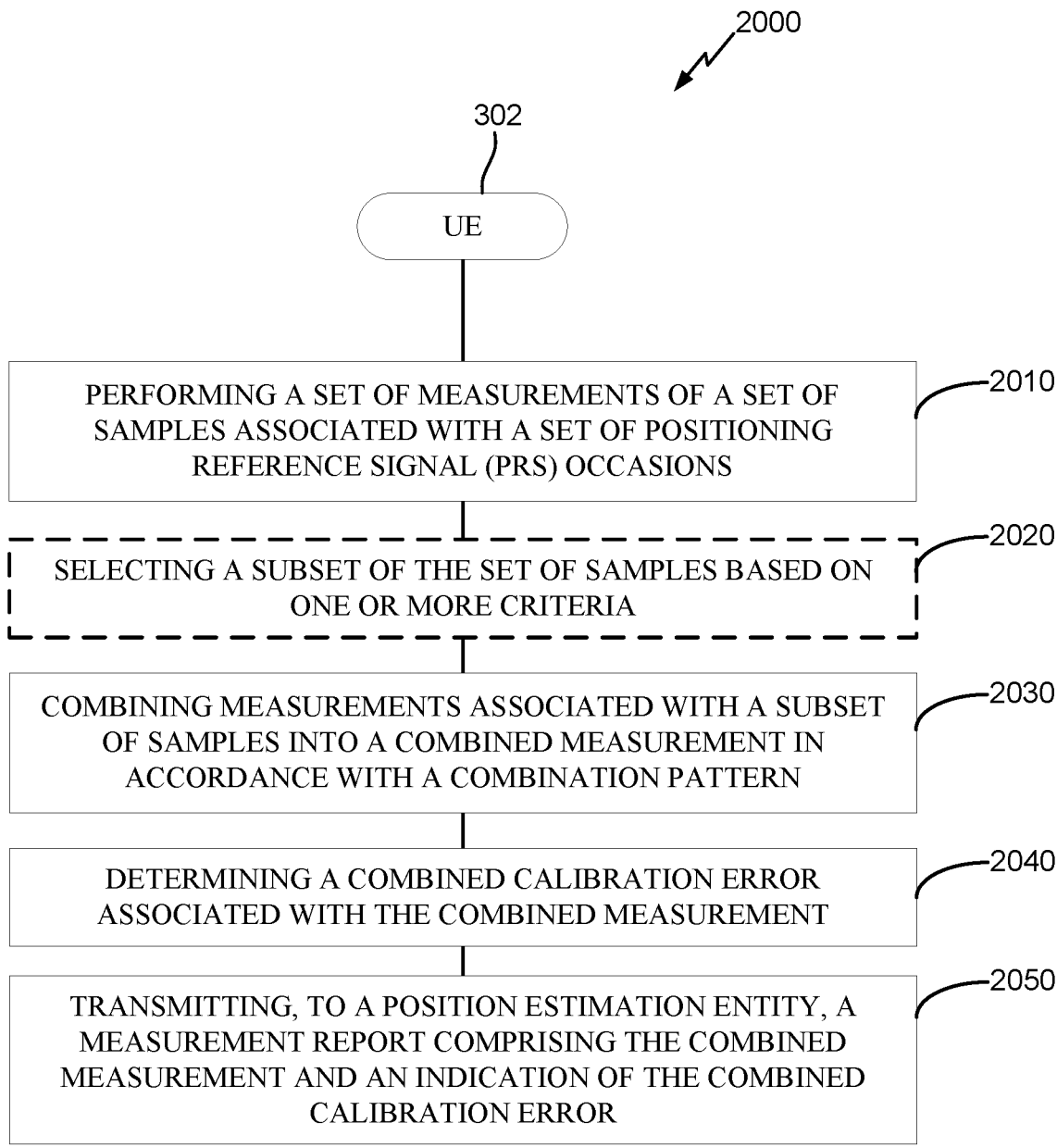
FIG. 20 illustrates an exemplary process of wireless communication, according to aspects of the disclosure.

FIG. 20 illustrates an exemplary process 2000 of wireless communication, according to aspects of the disclosure. In an aspect, the process 2000 may be performed by a UE, such as UE 302.

At 2010, UE 302 (e.g., receiver 312 or 322, processor(s) 332, measurement report component 342, etc.) performs a set of measurements of a set of samples associated with a set of positioning reference signal (PRS) occasions. In some designs, the set of measurements may include measurements associated with TDOA, RSRP, RSTD, RTT (e.g., Rx-Tx, etc.), carrier phase, AoA, AoD, and so on. In some designs, a means for performing the measurement(s) at 2021 may include receiver 312 or 322, processor(s) 332, measurement report component 342, etc., of UE 302.

At 2020, UE 302 (e.g., processor(s) 332, measurement report component 342, etc.) optionally selects a subset of the set of samples based on one or more criteria. In some designs, a means for performing the selection at 2020 may include processor(s) 332, measurement report component 342, etc., of UE 302.

At 2030, UE 302 (e.g., processor(s) 332, measurement report component 342, etc.) combines measurements associated with a subset of samples into a combined measurement in accordance with a combination pattern. In some designs, a means for performing the combining at 2030 may include processor(s) 332, measurement report component 342, etc., of UE 302.

At 2040, UE 302 (e.g., processor(s) 332, measurement report component 342, etc.) determines a combined calibration error associated with the combined measurement. In some designs, a means for performing the determination at 2040 may include processor(s) 332, measurement report component 342, etc., of UE 302.

At 2050, UE 302 (e.g., transmitter 314 or 324, data bus 334, etc.) transmits, to a position estimation, a measurement report comprising the combined measurement and an indication of the combined calibration error. In some designs, if UE 302 itself corresponds to the position estimation entity, the transmission at 2050 may be an internal or logical transfer of the measurement report. In some designs, the indication may be included in the measurement report itself. In other designs, the indication may be communicated separately from the measurement (e.g., via UE capability indication, etc.). In some designs, a means for performing the transmission at 2050 may include transmitter 314 or 324, data bus 334, etc., of UE 302.

Figure 21:
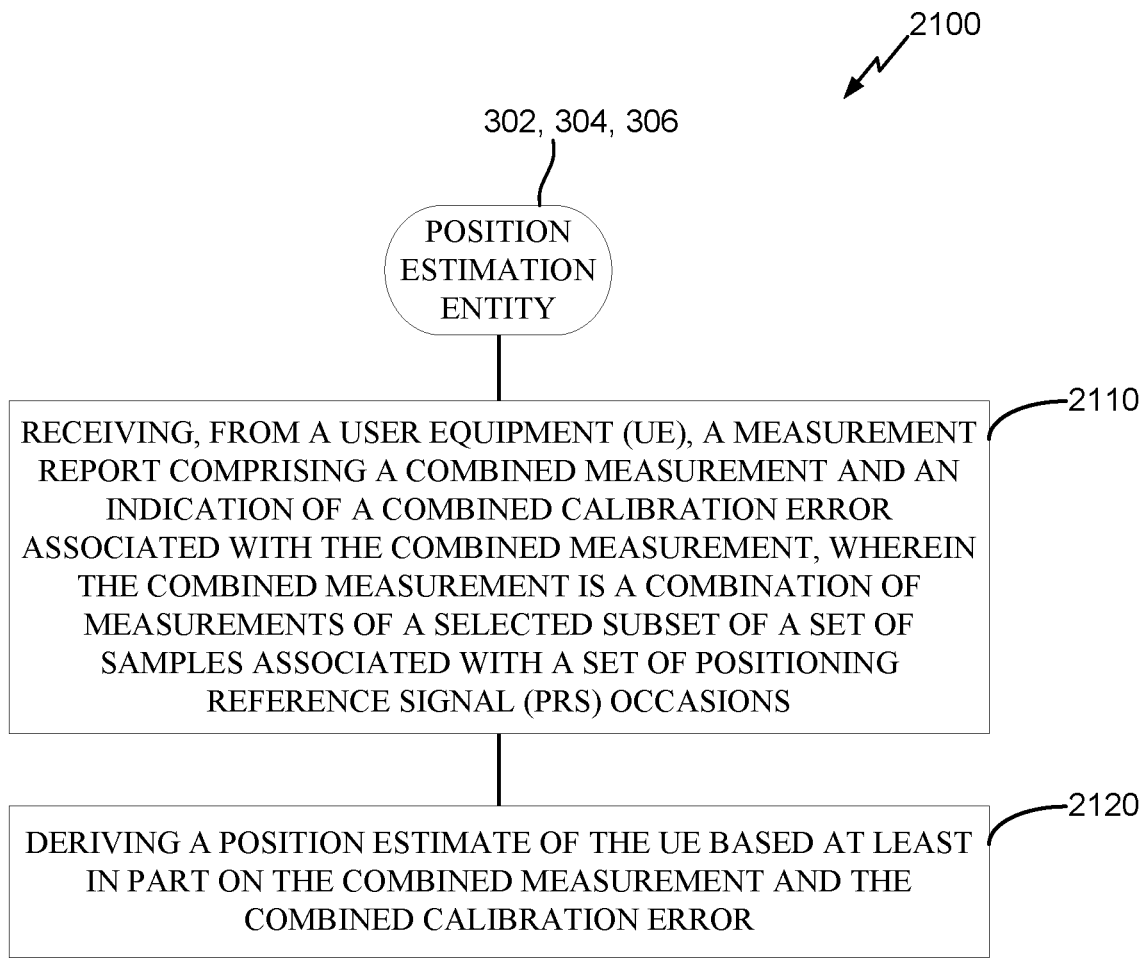
FIG. 21 illustrates an exemplary process of wireless communication, according to aspects of the disclosure.

FIG. 21 illustrates an exemplary process 2100 of wireless communication, according to aspects of the disclosure. In an aspect, the process 2100 may be performed by a position estimation entity, such as UE 302, LMF 306, or BS 304 (e.g., in a scenario where the LMF is integrated with BS 304), location server, etc.

At 2110, the position estimation entity (e.g., receiver 312 or 322 or 352 or 362, network transceiver(s) 380 or 390, processor(s) 332 or 384 or 394, data buses 334 or 382, etc.) receives, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions. In some designs, the combined measurement may include measurements associated with TDOA, RSRP, RSTD, RTT (e.g., Rx-Tx, etc.), carrier phase, AoD, AoA, and so on. In some designs, the indication may be included in the measurement report itself. In other designs, the indication may be communicated separately from the measurement (e.g., via UE capability indication, etc.). In some designs, a means for performing the reception at 2110 may include receiver 312 or 322 or 352 or 362, network transceiver(s) 380 or 390, processor(s) 332 or 384 or 394, data buses 334 or 382, etc., depending on whether the position estimation entity corresponds to UE 302 (e.g., for UE-based position estimation) or BS 304 (e.g., LMF, etc.) or a network entity 306 (e.g., LMF, etc.).

At 2120, the position estimation entity (e.g., processor(s) 332 or 384 or 394, data buses 334 or 382, measurement report component 342 or 388 or 398, etc.) derives a position estimate of the UE based at least in part on the combined measurement and the combined calibration error. For example, in some designs, the position estimation entity may derive the position estimate by using combined measurement(s) associated with the same combination pattern only first and/or the same combined calibration error only first. If one combination pattern fails, LMF may try a different one until all 'single' combination based position estimates fails. If this attempt fails, the position estimation entity may then attempt to derive the position estimate based on measurements associated with at least two combination patterns and/or at last two combined calibration errors (e.g., in case of FIG. 16 as discussed below, the position estimation entity may first attempt to derive position estimate based on M1 and M2, and may then consider M3 if the M1+M2 position estimate derivation fails). In some designs, a means for performing the derivation at 2120 may include processor(s) 332 or 384 or 394, data buses 334 or 382, measurement report component 342 or 388 or 398, etc., depending on whether the position estimation entity corresponds to UE 302 (e.g., for UE-based position estimation) or BS 304 (e.g., LMF, etc.) or a network entity 306 (e.g., LMF, etc.).

Referring to FIGS. 20-21, in some designs, the indication of the combined calibration error comprises an indication of a transmission error group (TEG) associated with the combined measurement. In some designs, the TEG is associated with a mean and variance of the combined calibration error, or the indicated TEG corresponds to a combined TEG that is based on a subset of a set of base TEGs, or a combination thereof. In some designs, the subset of base TEGs is indicated in the measurement report via a combination of the set of base TEGs, or each of the subset of base TEGs is individually indicated (e.g., in the measurement report or via UE capability indication, e.g., UE may send a list of base TEGs to LMF or gNB as its capability). For example, in some designs, a new TEG ID may be defined for the combined measurement (e.g., each TEG includes mean and variance of the combined calibration error. In another example, a list of base TEGs is defined (one TEG per panel, per beam, etc.). Then, a list of combined TEGs may be defined relative to the list of base TEGs (e.g., combined TEG may be associated with some subset of base TEGs). This association may be based on (or indicated by) the combination pattern. In another example, UE may report multiple TEG IDs for each combined measurement (e.g., note that this operation may violate some standards which require one TEG per measurement).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: performing a set of measurements of a set of samples associated with a set of positioning reference signal (PRS) occasions; combining measurements associated with a subset of samples into a combined measurement in accordance with a combination pattern; and transmitting, to a position estimation entity, a measurement report comprising the combined measurement and an indication of the combination pattern.

Clause 2. The method of clause 1, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 3. The method of clause 2, wherein the weight vector comprises a set of bits, with each bit indicating whether a respective measurement associated with a corresponding sample of the set of PRS occasions is part of the combined measurement.

Clause 4. The method of any of clauses 1 to 3, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 5. The method of clause 4, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 6. The method of any of clauses 1 to 5, wherein the indication of the combination pattern further comprises an indication of one or more criteria by which the subset of samples is selected by the UE.

Clause 7. A method of operating a position estimation entity, comprising: receiving, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and deriving a position estimate of the UE based at least in part on the combined measurement and the combination pattern.

Clause 8. The method of clause 7, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 9. The method of clause 8, wherein the weight vector comprises a set of bits, with each bit indicating whether a respective measurement associated with a corresponding sample of the set of PRS occasions is part of the combined measurement.

Clause 10. The method of any of clauses 7 to 9, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 11. The method of clause 10, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 12. The method of any of clauses 7 to 11, wherein the indication of the combination pattern further comprises an indication of one or more criteria by which the subset of samples is selected by the UE.

Clause 13. A method of operating a user equipment (UE), comprising: performing a set of measurements of a set of samples associated with a set of positioning reference signal (PRS) occasions; combining measurements associated with a subset of samples into a combined measurement in accordance with a combination pattern; determining a combined calibration error associated with the combined measurement; transmitting, to a position estimation entity, a measurement report comprising the combined measurement and an indication of the combined calibration error.

Clause 14. The method of clause 13, wherein the indication of the combined calibration error comprises an indication of a transmission error group (TEG) associated with the combined measurement.

Clause 15. The method of clause 14, wherein the indicated TEG is associated with a mean and variance of the combined calibration error, or wherein the indicated TEG corresponds to a combined TEG that is based on a subset of a set of base TEGs, or a combination thereof.

Clause 16. The method of clause 15, wherein the subset of base TEGs is indicated in the measurement report via a combination of the set of base TEGs, or wherein each of the subset of base TEGs is individually indicated in the measurement report.

Clause 17. A method of operating a position estimation entity, comprising: receiving, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and deriving a position estimate of the UE based at least in part on the combined measurement and the combined calibration error.

Clause 18. The method of clause 17, wherein the indication of the combined calibration error comprises an indication of a transmission error group (TEG) associated with the combined measurement.

Clause 19. The method of clause 18, wherein the indicated TEG is associated with a mean and variance of the combined calibration error, or wherein the indicated TEG corresponds to a combined TEG that is based on a subset of a set of base TEGs, or a combination thereof.

Clause 20. The method of clause 19, wherein the subset of base TEGs is indicated in the measurement report via a combination of the set of base TEGs, or wherein each of the subset of base TEGs is individually indicated in the measurement report.

Clause 21. A user equipment (UE), comprising: a memory; at least one transceiver; and at least one processor communicatively coupled to the memory and the at least one transceiver, the at least one processor configured to: perform a set of measurements of a set of samples associated with a set of positioning reference signal (PRS) occasions; combine measurements associated with a subset of samples into a combined measurement in accordance with a combination pattern; and transmit, via the at least one transceiver, to a position estimation entity, a measurement report comprising the combined measurement and an indication of the combination pattern.

Clause 22. The UE of clause 21, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 23. The UE of clause 22, wherein the weight vector comprises a set of bits, with each bit indicating whether a respective measurement associated with a corresponding sample of the set of PRS occasions is part of the combined measurement.

Clause 24. The UE of any of clauses 21 to 23, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 25. The UE of clause 24, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 26. The UE of any of clauses 21 to 25, wherein the indication of the combination pattern further comprises an indication of one or more criteria by which the subset of samples is selected by the UE.

Clause 27. A position estimation entity, comprising: a memory; at least one transceiver; and at least one processor communicatively coupled to the memory and the at least one transceiver, the at least one processor configured to: receive, via the at least one transceiver, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and derive a position estimate of the UE based at least in part on the combined measurement and the combination pattern.

Clause 28. The position estimation entity of clause 27, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 29. The position estimation entity of clause 28, wherein the weight vector comprises a set of bits, with each bit indicating whether a respective measurement associated with a corresponding sample of the set of PRS occasions is part of the combined measurement.

Clause 30. The position estimation entity of any of clauses 27 to 29, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 31. The position estimation entity of clause 30, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 32. The position estimation entity of any of clauses 27 to 31, wherein the indication of the combination pattern further comprises an indication of one or more criteria by which the subset of samples is selected by the UE.

Clause 33. An UE, comprising: a memory; at least one transceiver; and at least one processor communicatively coupled to the memory and the at least one transceiver, the at least one processor configured to: perform a set of measurements of a set of samples associated with a set of positioning reference signal (PRS) occasions; combine measurements associated with a subset of samples into a combined measurement in accordance with a combination pattern; determine a combined calibration error associated with the combined measurement; transmit, via the at least one transceiver, to a position estimation entity, a measurement report comprising the combined measurement and an indication of the combined calibration error.

Clause 34. The UE of clause 33, wherein the indication of the combined calibration error comprises an indication of a transmission error group (TEG) associated with the combined measurement.

Clause 35. The UE of clause 34, wherein the indicated TEG is associated with a mean and variance of the combined calibration error, or wherein the indicated TEG corresponds to a combined TEG that is based on a subset of a set of base TEGs, or a combination thereof.

Clause 36. The UE of clause 35, wherein the subset of base TEGs is indicated in the measurement report via a combination of the set of base TEGs, or wherein each of the subset of base TEGs is individually indicated in the measurement report.

Clause 37. A position estimation entity, comprising: a memory; at least one transceiver; and at least one processor communicatively coupled to the memory and the at least one transceiver, the at least one processor configured to: receive, via the at least one transceiver, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and derive a position estimate of the UE based at least in part on the combined measurement and the combined calibration error.

Clause 38. The position estimation entity of clause 37, wherein the indication of the combined calibration error comprises an indication of a transmission error group (TEG) associated with the combined measurement.

Clause 39. The position estimation entity of clause 38, wherein the indicated TEG is associated with a mean and variance of the combined calibration error, or wherein the indicated TEG corresponds to a combined TEG that is based on a subset of a set of base TEGs, or a combination thereof.

Clause 40. The position estimation entity of clause 39, wherein the subset of base TEGs is indicated in the measurement report via a combination of the set of base TEGs, or wherein each of the subset of base TEGs is individually indicated in the measurement report.

Clause 41. A user equipment (UE), comprising: means for performing a set of measurements of a set of samples associated with a set of positioning reference signal (PRS) occasions; means for combining measurements associated with a subset of samples into a combined measurement in accordance with a combination pattern; and means for transmitting, to a position estimation entity, a measurement report comprising the combined measurement and an indication of the combination pattern.

Clause 42. The UE of clause 41, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 43. The UE of clause 42, wherein the weight vector comprises a set of bits, with each bit indicating whether a respective measurement associated with a corresponding sample of the set of PRS occasions is part of the combined measurement.

Clause 44. The UE of any of clauses 41 to 43, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 45. The UE of clause 44, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 46. The UE of any of clauses 41 to 45, wherein the indication of the combination pattern further comprises an indication of one or more criteria by which the subset of samples is selected by the UE.

Clause 47. A position estimation entity, comprising: means for receiving, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and means for deriving a position estimate of the UE based at least in part on the combined measurement and the combination pattern.

Clause 48. The position estimation entity of clause 47, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 49. The position estimation entity of clause 48, wherein the weight vector comprises a set of bits, with each bit indicating whether a respective measurement associated with a corresponding sample of the set of PRS occasions is part of the combined measurement.

Clause 50. The position estimation entity of any of clauses 47 to 49, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 51. The position estimation entity of clause 50, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 52. The position estimation entity of any of clauses 47 to 51, wherein the indication of the combination pattern further comprises an indication of one or more criteria by which the subset of samples is selected by the UE.

Clause 53. An UE, comprising: means for performing a set of measurements of a set of samples associated with a set of positioning reference signal (PRS) occasions; means for combining measurements associated with a subset of samples into a combined measurement in accordance with a combination pattern; means for determining a combined calibration error associated with the combined measurement; means for transmitting, to a position estimation entity, a measurement report comprising the combined measurement and an indication of the combined calibration error.

Clause 54. The UE of clause 53, wherein the indication of the combined calibration error comprises an indication of a transmission error group (TEG) associated with the combined measurement.

Clause 55. The UE of clause 54, wherein the indicated TEG is associated with a mean and variance of the combined calibration error, or wherein the indicated TEG corresponds to a combined TEG that is based on a subset of a set of base TEGs, or a combination thereof.

Clause 56. The UE of clause 55, wherein the subset of base TEGs is indicated in the measurement report via a combination of the set of base TEGs, or wherein each of the subset of base TEGs is individually indicated in the measurement report.

Clause 57. A position estimation entity, comprising: means for receiving, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and means for deriving a position estimate of the UE based at least in part on the combined measurement and the combined calibration error.

Clause 58. The position estimation entity of clause 57, wherein the indication of the combined calibration error comprises an indication of a transmission error group (TEG) associated with the combined measurement.

Clause 59. The position estimation entity of clause 58, wherein the indicated TEG is associated with a mean and variance of the combined calibration error, or wherein the indicated TEG corresponds to a combined TEG that is based on a subset of a set of base TEGs, or a combination thereof.

Clause 60. The position estimation entity of clause 59, wherein the subset of base TEGs is indicated in the measurement report via a combination of the set of base TEGs, or wherein each of the subset of base TEGs is individually indicated in the measurement report.

Clause 61. A non-transitory computer-readable medium storing computer-executable instructions that, when executed by a user equipment (UE), cause the UE to: perform a set of measurements of a set of samples associated with a set of positioning reference signal (PRS) occasions; combine measurements associated with a subset of samples into a combined measurement in accordance with a combination pattern; and transmit, to a position estimation entity, a measurement report comprising the combined measurement and an indication of the combination pattern.

Clause 62. The non-transitory computer-readable medium of clause 61, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 63. The non-transitory computer-readable medium of clause 62, wherein the weight vector comprises a set of bits, with each bit indicating whether a respective measurement associated with a corresponding sample of the set of PRS occasions is part of the combined measurement.

Clause 64. The non-transitory computer-readable medium of any of clauses 61 to 63, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 65. The non-transitory computer-readable medium of clause 64, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 66. The non-transitory computer-readable medium of any of clauses 61 to 65, wherein the indication of the combination pattern further comprises an indication of one or more criteria by which the subset of samples is selected by the UE.

Clause 67. A non-transitory computer-readable medium storing computer-executable instructions that, when executed by a position estimation entity, cause the position estimation entity to: receive, from a user equipment (UE), a measurement report comprising a combined measurement and an indication of a combination pattern, wherein the combined measurement is a combination of measurements of a subset of a set of samples associated with a set of positioning reference signal (PRS) occasions in accordance with the combination pattern; and derive a position estimate of the UE based at least in part on the combined measurement and the combination pattern.

Clause 68. The non-transitory computer-readable medium of clause 67, wherein the set of samples is associated with multiple transmission reception points (TRPs) or PRS resources, and the subset of samples is associated with only one of the multiple TRPs or PRS resources, or wherein the indication of the combination pattern comprises a weight vector, or a combination thereof.

Clause 69. The non-transitory computer-readable medium of clause 68, wherein the weight vector comprises a set of bits, with each bit indicating whether a respective measurement associated with a corresponding sample of the set of PRS occasions is part of the combined measurement.

Clause 70. The non-transitory computer-readable medium of any of clauses 67 to 69, wherein the indication of the combination pattern comprises a number of samples in the subset of samples, or wherein the indication of the combination pattern comprises a timestamp associated with an earliest of the set of PRS occasions or a latest of the set of PRS occasions, and the indication comprises a PRS occasion range that is offset from the timestamp, or wherein the subset of samples is associated with one of a plurality of consistency groups, or any combination thereof.

Clause 71. The non-transitory computer-readable medium of clause 70, wherein information associated with the plurality of consistency groups is received at the UE via assistance data, or wherein a number of the plurality of consistency groups is set to less than or equal than a threshold based in part on a length of a time window that spans the set of PRS occasions, or wherein at least one consistency group among the plurality of consistency groups is associated with a requirement for a minimum number of samples that contribute to the combined measurement, or any combination thereof.

Clause 72. The non-transitory computer-readable medium of any of clauses 67 to 71, wherein the indication of the combination pattern further comprises an indication of one or more criteria by which the subset of samples is selected by the UE.

Clause 73. A non-transitory computer-readable medium storing computer-executable instructions that, when executed by an UE, cause the UE to: perform a set of measurements of a set of samples associated with a set of positioning reference signal (PRS) occasions; combine measurements associated with a subset of samples into a combined measurement in accordance with a combination pattern; determine a combined calibration error associated with the combined measurement; transmit, to a position estimation entity, a measurement report comprising the combined measurement and an indication of the combined calibration error.

Clause 74. The non-transitory computer-readable medium of clause 73, wherein the indication of the combined calibration error comprises an indication of a transmission error group (TEG) associated with the combined measurement.

Clause 75. The non-transitory computer-readable medium of clause 74, wherein the indicated TEG is associated with a mean and variance of the combined calibration error, or wherein the indicated TEG corresponds to a combined TEG that is based on a subset of a set of base TEGs, or a combination thereof.

Clause 76. The non-transitory computer-readable medium of clause 75, wherein the subset of base TEGs is indicated in the measurement report via a combination of the set of base TEGs, or wherein each of the subset of base TEGs is individually indicated in the measurement report.

Clause 77. A non-transitory computer-readable medium storing computer-executable instructions that, when executed by a position estimation entity, cause the position estimation entity to: receive, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and derive a position estimate of the UE based at least in part on the combined measurement and the combined calibration error.

Clause 78. The non-transitory computer-readable medium of clause 77, wherein the indication of the combined calibration error comprises an indication of a transmission error group (TEG) associated with the combined measurement.

Clause 79. The non-transitory computer-readable medium of clause 78, wherein the indicated TEG is associated with a mean and variance of the combined calibration error, or wherein the indicated TEG corresponds to a combined TEG that is based on a subset of a set of base TEGs, or a combination thereof.

Clause 80. The non-transitory computer-readable medium of clause 79, wherein the subset of base TEGs is indicated in the measurement report via a combination of the set of base TEGs, or wherein each of the subset of base TEGs is individually indicated in the measurement report.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The invention claimed is:

1. A method of operating a user equipment (UE), comprising:
   performing a set of measurements of a set of samples associated with a set of positioning reference signal (PRS) occasions;
   combining measurements associated with a subset of samples into a combined measurement in accordance with a combination pattern;
   determining a combined calibration error associated with the combined measurement; and
   transmitting, to a position estimation entity, a measurement report comprising the combined measurement and an indication of the combined calibration error.

2. The method of claim 1, wherein the indication of the combined calibration error comprises an indication of a transmission error group (TEG) associated with the combined measurement.

3. The method of claim 2,
   wherein the indicated TEG is associated with a mean and variance of the combined calibration error, or
   wherein the indicated TEG corresponds to a combined TEG that is based on a subset of a set of base TEGs, or
   a combination thereof.

4. The method of claim 3,
   wherein the subset of base TEGs is indicated in the measurement report via a combination of the set of base TEGs, or
   wherein each of the subset of base TEGs is individually indicated in the measurement report.

5. A method of operating a position estimation entity, comprising:
   receiving, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and
   deriving a position estimate of the UE based at least in part on the combined measurement and the combined calibration error.

6. The method of claim 5, wherein the indication of the combined calibration error comprises an indication of a transmission error group (TEG) associated with the combined measurement.

7. The method of claim 6,
   wherein the indicated TEG is associated with a mean and variance of the combined calibration error, or wherein the indicated TEG corresponds to a combined TEG that is based on a subset of a set of base TEGs, or a combination thereof.

8. The method of claim 7,
wherein the subset of base TEGs is indicated in the measurement report via a combination of the set of base TEGs, or
wherein each of the subset of base TEGs is individually indicated in the measurement report.

9. A user equipment (UE), comprising:
a memory;
at least one transceiver; and
at least one processor communicatively coupled to the memory and the at least one transceiver, the at least one processor configured to:
perform a set of measurements of a set of samples associated with a set of positioning reference signal (PRS) occasions;
combine measurements associated with a subset of samples into a combined measurement in accordance with a combination pattern;
determine a combined calibration error associated with the combined measurement; and
transmit, via the at least one transceiver, to a position estimation entity, a measurement report comprising the combined measurement and an indication of the combined calibration error.

10. The UE of claim 9, wherein the indication of the combined calibration error comprises an indication of a transmission error group (TEG) associated with the combined measurement.

11. The UE of claim 10,
wherein the indicated TEG is associated with a mean and variance of the combined calibration error, or
wherein the indicated TEG corresponds to a combined TEG that is based on a subset of a set of base TEGs, or a combination thereof.

12. The UE of claim 11,
wherein the subset of base TEGs is indicated in the measurement report via a combination of the set of base TEGs, or
wherein each of the subset of base TEGs is individually indicated in the measurement report.

13. A position estimation entity, comprising:
a memory;
at least one transceiver; and
at least one processor communicatively coupled to the memory and the at least one transceiver, the at least one processor configured to:
receive, via the at least one transceiver, from a user equipment (UE), a measurement report comprising a combined measurement and an indication of a combined calibration error associated with the combined measurement, wherein the combined measurement is a combination of measurements of a subset of a set of samples associated with a set of positioning reference signal (PRS) occasions; and
derive a position estimate of the UE based at least in part on the combined measurement and the combined calibration error.

14. The position estimation entity of claim 13, wherein the indication of the combined calibration error comprises an indication of a transmission error group (TEG) associated with the combined measurement.

15. The position estimation entity of claim 14,
wherein the indicated TEG is associated with a mean and variance of the combined calibration error, or
wherein the indicated TEG corresponds to a combined TEG that is based on a subset of a set of base TEGs, or a combination thereof.

16. The position estimation entity of claim 15,
wherein the subset of base TEGs is indicated in the measurement report via a combination of the set of base TEGs, or
wherein each of the subset of base TEGs is individually indicated in the measurement report.

* * * * *